United States Patent
Lablans

(10) Patent No.: US 9,298,423 B2
(45) Date of Patent: Mar. 29, 2016

(54) METHODS AND SYSTEMS FOR DETERMINING CHARACTERISTICS OF A SEQUENCE OF N-STATE SYMBOLS

(71) Applicant: Peter Lablans, Morris Township, NJ (US)

(72) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 421 days.

(21) Appl. No.: 13/831,394

(22) Filed: Mar. 14, 2013

(65) Prior Publication Data

US 2014/0032623 A1  Jan. 30, 2014

Related U.S. Application Data

(60) Provisional application No. 61/674,932, filed on Jul. 24, 2012.

(51) Int. Cl.
G06F 7/58 (2006.01)

(52) U.S. Cl.
CPC . *G06F 7/584* (2013.01); *G06F 7/58* (2013.01)

(58) Field of Classification Search
None
See application file for complete search history.

(56) References Cited

U.S. PATENT DOCUMENTS

| | | | |
|---|---|---|---|
| 3,129,340 A | 4/1964 | Baskin | |
| 3,142,037 A | 7/1964 | Gazale | |
| 3,210,529 A | 10/1965 | Hanson | |
| 3,283,256 A | 11/1966 | Hurowirz | |
| 3,492,496 A | 1/1970 | Callan | |
| 3,515,805 A | 6/1970 | Fracassi | |
| 4,286,333 A | 8/1981 | Franklin | |
| 5,157,689 A | 10/1992 | Kurihara | |
| 5,844,925 A | 12/1998 | Dent | |
| 6,665,692 B1 | 12/2003 | Nieminen | |
| 6,816,447 B1 | 11/2004 | Lee et al. | |
| 6,956,948 B1 | 10/2005 | Hwang et al. | |

(Continued)

OTHER PUBLICATIONS

Panuwat Panratanapaitoon ("Comparison between Gold and PR-QMF codes for CDMA applications", A thesis submitted for the degree of Bachelor of Engineering in Electronic and Communications Engineering, Curtin University of Technology, Western Australia, Oct. 31, 2003).

(Continued)

*Primary Examiner* — Michael D Yaary

(57) ABSTRACT

Maximum length properties of n-state sequences of n-state symbols with n=2 or n>2 are tested. Checkwords are generated from p consecutive n-state symbols in a sequence of n-state symbols which may overlap by (p−1) n-state symbols. If a sequence has $n^p-1$ n-state symbols in which 2 consecutive checkwords overlap in (p−1) n-state symbols and each checkword formed in the extended sequence is unique, then the sequence is a maximum length n-state sequence. An n-state feedback shift register based sequence generator with p n-state register elements is tested on the content of the shift register for $n^p-1$ cycles. If the shift register content is not repeated the sequence is maximum length. Generation of a sequence is stopped when the content repeats. Non-reversible n-state inverters and non-reversible n-state logic functions are applied to generate n-state sequences.

20 Claims, 34 Drawing Sheets

(56) References Cited

U.S. PATENT DOCUMENTS

| | | |
|---|---|---|
| 7,436,963 B2 | 10/2008 | Lo Iacono et al. |
| 7,580,472 B2 | 8/2009 | Lablans |
| 7,725,779 B2 | 5/2010 | Lablans |
| 8,180,817 B2 | 5/2012 | Lablans |
| 2002/0176484 A1 | 11/2002 | Ovalekar |
| 2007/0005673 A1* | 1/2007 | Lablans ................ 708/250 |
| 2007/0239812 A1* | 10/2007 | Lablans ................ 708/252 |

OTHER PUBLICATIONS

G. Armanavicius, R. Kazys ("Analysis of Pseudo noise sequences for multi channel distance measurements", Prof. K. Barsauskas ultrasound institute, Kansa University of Technology, ISSN 1392-2114 ULTRAGARSAS, Nr.4(37).2000).

Malika De et al ("Fast parallel Algorithm for Ternary multiplication using Multivalued I2L Technology", IEEE Transactions on Computers, vol. 43, No. 5, May 1994).

* cited by examiner

```
1   % try all configurations in a 4-stage binary sequence generator
2   xor2=[0 1;1 0]+1;
3   inv2=[0 1;0 0]+1;
4       inv20=inv2(1,:);
5       for i1=1:2
6           inv21=inv2(i1,:);
7           for i2=1:2
8               inv22=inv2(i2,:);
9               for i3=1:2
10                  inv23=inv2(i3,:);
11                  inv24=inv2(1,:);
12                  shifts=[1 0 1 1]+1;
13
14                  for i=1:15
15                      in=inv24(shifts(4));
16                      t3=inv23(in);
17                      t2=inv22(in);
18                      t1=inv21(in);
19                      t0=inv20(in);
20
21                      shifts(4)=xor2(t3,shifts(3));
22                      shifts(3)=xor2(t2,shifts(2));
23                      shifts(2)=xor2(t1,shifts(1));
24                      shifts(1)=t0;
25                      out(i)=t0;
26                  end
27                  ccf3mod(out,out)
28                  pause
29              end
30          end
31      end
```

FIG. 6

| seq. no. | | | | | | | | | | | | | | | | |
|---|---|---|---|---|---|---|---|---|---|---|---|---|---|---|---|---|
| 1 | g | 1 | 1 | 0 | 1 | 1 | 1 | 1 | 1 | 1 | 0 | 1 | 1 | 1 | 1 | 1 |
| 2 | g | 1 | 0 | 1 | 1 | 0 | 1 | 1 | 1 | 1 | 1 | 1 | 1 | 1 | 1 | 1 |
| 3 | g | 1 | 1 | 1 | 0 | 1 | 1 | 1 | 0 | 1 | 1 | 1 | 1 | 0 | 1 | 0 |
| 4 | g | 1 | 0 | 0 | 0 | 1 | 1 | 0 | 1 | 0 | 1 | 1 | 0 | 1 | 1 | 1 |
| 5 | g | 1 | 1 | 0 | 0 | 0 | 1 | 0 | 1 | 1 | 0 | 1 | 0 | 0 | 1 | 1 |
| 6 | g | 1 | 0 | 1 | 0 | 0 | 1 | 1 | 1 | 0 | 1 | 0 | 0 | 1 | 0 | 1 |
| 7 | g | 1 | 1 | 0 | 0 | 1 | 1 | 0 | 1 | 1 | 1 | 0 | 1 | 1 | 0 | 1 |
| 8 | g | 1 | 1 | 0 | 1 | 1 | 1 | 1 | 0 | 1 | 1 | 0 | 1 | 1 | 1 | 0 |

15 bit sequence

FIG. 7

| no. | initial shifts | | | | | final shifts | | | | | inv1 | | inv2 | | inv3 | |
|---|---|---|---|---|---|---|---|---|---|---|---|---|---|---|---|---|
| 1 | g | 1 | 1 | 0 | 1 | 1 | 0 | 1 | g | 1 | g | 1 | g | 1 | g | 1 |
| 2 | g | 1 | 1 | 0 | 1 | 0 | 0 | 1 | 1 | g | 1 | g | 1 | g | 0 | |
| 3 | g | 1 | 1 | 0 | 1 | 0 | 0 | 0 | 1 | g | 1 | g | 0 | g | 1 | |
| 4 | g | 1 | 1 | 0 | 1 | 1 | 0 | 1 | 1 | g | 0 | g | 0 | g | 0 | |
| 5 | g | 1 | 1 | 0 | 1 | 0 | 1 | 1 | 0 | g | 0 | g | 1 | g | 1 | |
| 6 | g | 1 | 1 | 0 | 1 | 0 | 0 | 1 | 1 | g | 0 | g | 0 | g | 0 | |
| 7 | g | 1 | 1 | 0 | 0 | 1 | 0 | 1 | 1 | g | 0 | g | 0 | g | 1 | |
| 8 | g | 1 | 1 | 0 | 1 | 1 | 0 | 1 | 1 | g | 0 | g | 0 | g | 0 | |

FIG. 8

| | | | | | | | 901 |
|---|---|---|---|---|---|---|---|
| 1 | 0 | 1 | 1 | 9 | 11 | 9 | 1 |
| 1 | 0 | 1 | 0 | 9 | 10 | 9 | 1 |
| 0 | 1 | 0 | 1 | 9 | 5  | 9 | 1 |
| 1 | 1 | 0 | 1 | 9 | 13 | 9 | 1 |
| 1 | 0 | 0 | 1 | 9 | 9  | 9 | 1 |
| 1 | 0 | 1 | 1 | 9 | 11 | 9 | 1 |
| 1 | 0 | 1 | 0 | 9 | 10 | 9 | 1 |
| 0 | 1 | 0 | 1 | 9 | 5  | 9 | 1 |
| 1 | 1 | 0 | 1 | 9 | 13 | 9 | 1 |
| 1 | 0 | 0 | 1 | 9 | 9  | 9 | 1 |
| 1 | 0 | 1 | 1 | 9 | 11 | 9 | 1 |
| 1 | 0 | 1 | 0 | 9 | 10 | 9 | 1 |
| 0 | 1 | 0 | 1 | 9 | 5  | 9 | 1 |
| 1 | 1 | 0 | 1 | 9 | 13 | 9 | 1 |
| 1 | 0 | 0 | 1 | 9 | 9  | 9 | 1 |

FIG. 9A

| | | | | | | | 902 |
|---|---|---|---|---|---|---|---|
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |
| 1 | 0 | 1 | 1 | 9 | 11 | 9 | 2 |

FIG. 9B

| | | | | | | | | |
|---|---|---|---|---|---|---|---|---|
| 1 | 0 | 1 | 1 | 9 | 11 | 9 | 3 | 903 |
| 1 | 0 | 0 | 0 | 9 | 8 | 9 | 3 | |
| 0 | 1 | 0 | 0 | 9 | 4 | 9 | 3 | |
| 0 | 0 | 1 | 0 | 9 | 2 | 9 | 3 | |
| 0 | 0 | 0 | 1 | 9 | 1 | 9 | 3 | |
| 1 | 1 | 0 | 1 | 9 | 13 | 9 | 3 | |
| 1 | 0 | 1 | 1 | 9 | 11 | 9 | 3 | |
| 1 | 0 | 0 | 0 | 9 | 8 | 9 | 3 | |
| 0 | 1 | 0 | 0 | 9 | 4 | 9 | 3 | |
| 0 | 0 | 1 | 0 | 9 | 2 | 9 | 3 | |
| 0 | 0 | 0 | 1 | 9 | 1 | 9 | 3 | |
| 1 | 1 | 0 | 1 | 9 | 13 | 9 | 3 | |
| 1 | 0 | 1 | 1 | 9 | 11 | 9 | 3 | |
| 1 | 0 | 0 | 0 | 9 | 8 | 9 | 3 | |
| 0 | 1 | 0 | 0 | 9 | 4 | 9 | 3 | |

| 1 | 0 | 1 | 1 | 9 | 11 | 9 | 4 |
| 1 | 0 | 0 | 1 | 9 | 9 | 9 | 4 |
| 1 | 0 | 0 | 0 | 9 | 8 | 9 | 4 |
| 0 | 1 | 0 | 0 | 9 | 4 | 9 | 4 |
| 0 | 0 | 1 | 0 | 9 | 2 | 9 | 4 |
| 0 | 0 | 0 | 1 | 9 | 1 | 9 | 4 |
| 1 | 1 | 0 | 0 | 9 | 12 | 9 | 4 |
| 0 | 1 | 1 | 0 | 9 | 6 | 9 | 4 |
| 0 | 0 | 1 | 1 | 9 | 3 | 9 | 4 |
| 1 | 1 | 0 | 1 | 9 | 13 | 9 | 4 |
| 1 | 0 | 1 | 0 | 9 | 10 | 9 | 4 |
| 0 | 1 | 0 | 1 | 9 | 5 | 9 | 4 |
| 1 | 1 | 1 | 0 | 9 | 14 | 9 | 4 |
| 0 | 1 | 1 | 1 | 9 | 7 | 9 | 4 |
| 1 | 1 | 1 | 1 | 9 | 15 | 9 | 4 |

| 1 | 0 | 1 | 1 | 9 | 11 | 9 | 5 |
| 1 | 1 | 1 | 0 | 9 | 14 | 9 | 5 |
| 0 | 1 | 1 | 1 | 9 | 7 | 9 | 5 |
| 1 | 0 | 0 | 0 | 9 | 8 | 9 | 5 |
| 0 | 1 | 0 | 0 | 9 | 4 | 9 | 5 |
| 0 | 0 | 1 | 0 | 9 | 2 | 9 | 5 |
| 0 | 0 | 0 | 1 | 9 | 1 | 9 | 5 |
| 1 | 0 | 1 | 1 | 9 | 11 | 9 | 5 |
| 1 | 1 | 1 | 0 | 9 | 14 | 9 | 5 |
| 0 | 1 | 1 | 1 | 9 | 7 | 9 | 5 |
| 1 | 0 | 0 | 0 | 9 | 8 | 9 | 5 |
| 0 | 1 | 0 | 0 | 9 | 4 | 9 | 5 |
| 0 | 0 | 1 | 0 | 9 | 2 | 9 | 5 |
| 0 | 0 | 0 | 1 | 9 | 1 | 9 | 5 |
| 1 | 0 | 1 | 1 | 9 | 11 | 9 | 5 |

| 1 | 0 | 1 | 1 | 9 | 11 | 9 | 6 |
| 1 | 1 | 1 | 1 | 9 | 15 | 9 | 6 |
| 1 | 1 | 0 | 1 | 9 | 13 | 9 | 6 |
| 1 | 1 | 0 | 0 | 9 | 12 | 9 | 6 |
| 0 | 1 | 1 | 0 | 9 |  6 | 9 | 6 |
| 0 | 0 | 1 | 1 | 9 |  3 | 9 | 6 |
| 1 | 0 | 1 | 1 | 9 | 11 | 9 | 6 |
| 1 | 1 | 1 | 1 | 9 | 15 | 9 | 6 |
| 1 | 1 | 0 | 1 | 9 | 13 | 9 | 6 |
| 1 | 1 | 0 | 0 | 9 | 12 | 9 | 6 |
| 0 | 1 | 1 | 0 | 9 |  6 | 9 | 6 |
| 0 | 0 | 1 | 1 | 9 |  3 | 9 | 6 |
| 1 | 0 | 1 | 1 | 9 | 11 | 9 | 6 |
| 1 | 1 | 1 | 1 | 9 | 15 | 9 | 6 |
| 1 | 1 | 0 | 1 | 9 | 13 | 9 | 6 |

| 1 | 0 | 1 | 1 | 9 | 11 | 9 | 7 |
| 1 | 1 | 0 | 0 | 9 | 12 | 9 | 7 |
| 0 | 1 | 1 | 0 | 9 | 6  | 9 | 7 |
| 0 | 0 | 1 | 1 | 9 | 3  | 9 | 7 |
| 1 | 0 | 0 | 0 | 9 | 8  | 9 | 7 |
| 0 | 1 | 0 | 0 | 9 | 4  | 9 | 7 |
| 0 | 0 | 1 | 0 | 9 | 2  | 9 | 7 |
| 0 | 0 | 0 | 1 | 9 | 1  | 9 | 7 |
| 1 | 0 | 0 | 1 | 9 | 9  | 9 | 7 |
| 1 | 1 | 0 | 1 | 9 | 13 | 9 | 7 |
| 1 | 1 | 1 | 1 | 9 | 15 | 9 | 7 |
| 1 | 1 | 1 | 0 | 9 | 14 | 9 | 7 |
| 0 | 1 | 1 | 1 | 9 | 7  | 9 | 7 |
| 1 | 0 | 1 | 0 | 9 | 10 | 9 | 7 |
| 0 | 1 | 0 | 1 | 9 | 5  | 9 | 7 |

| 1 | 0 | 1 | 1 | 9 | 11 | 9 | 8 |
| 1 | 1 | 0 | 1 | 9 | 13 | 9 | 8 |
| 1 | 1 | 1 | 0 | 9 | 14 | 9 | 8 |
| 0 | 1 | 1 | 1 | 9 | 7  | 9 | 8 |
| 1 | 0 | 1 | 1 | 9 | 11 | 9 | 8 |
| 1 | 1 | 0 | 1 | 9 | 13 | 9 | 8 |
| 1 | 1 | 1 | 0 | 9 | 14 | 9 | 8 |
| 0 | 1 | 1 | 1 | 9 | 7  | 9 | 8 |
| 1 | 0 | 1 | 1 | 9 | 11 | 9 | 8 |
| 1 | 1 | 0 | 1 | 9 | 13 | 9 | 8 |
| 1 | 1 | 1 | 0 | 9 | 14 | 9 | 8 |
| 0 | 1 | 1 | 1 | 9 | 7  | 9 | 8 |
| 1 | 0 | 1 | 1 | 9 | 11 | 9 | 8 |
| 1 | 1 | 0 | 1 | 9 | 13 | 9 | 8 |
| 1 | 1 | 1 | 0 | 9 | 14 | 9 | 8 |

FIG. 9H

```
% try configurations in a 3-stage 4-state
  Galois sequence generator
fp=[0 1 2 3;1 0 3 2;2 3 0 1;3 2 1 0]+1;
mp=[0 0 0 0;0 1 2 3;0 2 3 1;0 3 1 2]+1;
tel=0;
for i0=2:4
    inv0=mp(i0,:);
    for i1=1:4
        inv1=mp(i1,:);
        for i2=1:4
            inv2=mp(i2,:);
            test=0;
            shifts0=[1 0 3];
            shifts=[1 0 3]+1;
            for i=1:63
                in=shifts(3);
                in2=inv2(in);
                t2=fp(in2,shifts(2));
                in1=inv1(in);
                t1=fp(in1,shifts(1));
                t0=inv0(in);
                shifts(3)=t2;
                shifts(2)=t1;
                shifts(1)=t0;
                out(i)=t0;
            end
            outtest=[out out(1:2)];
            fword=seq2dec(out(1:3),4);
            tel=tel+1;
            restv(tel,1)=tel;
            restv(tel,3)=tel;
            for i=4:63
                cword=seq2dec(outtest(i:i+2),4);
                restv(tel,i)=(cword==fword)*i;
            end
```

FIG. 14

| | | | |
|---|---|---|---|
| 1 | 650 | 25 | 154 |
| 2 | 260 | 26 | 2010 |
| 3 | 65 | 27 | 0 |
| 4 | 65 | 28 | 0 |
| 5 | 260 | 29 | 154 |
| 6 | 495 | 30 | 0 |
| 7 | 154 | 31 | 0 |
| 8 | 154 | 32 | 340 |
| 9 | 65 | 33 | 195 |
| 10 | 279 | 34 | 402 |
| 11 | 402 | 35 | 154 |
| 12 | 650 | 36 | 154 |
| 13 | 65 | 37 | 154 |
| 14 | 154 | 38 | 0 |
| 15 | 185 | 39 | 0 |
| 16 | 402 | 40 | 957 |
| 17 | 195 | 41 | 154 |
| 18 | 154 | 42 | 0 |
| 19 | 154 | 43 | 650 |
| 20 | 154 | 44 | 0 |
| 21 | 154 | 45 | 402 |
| 22 | 0 | 46 | 340 |
| 23 | 340 | 47 | 0 |
| 24 | 0 | 48 | 0 |

FIG. 15

| | | |
|---|---|---|
| 1 | 11180 | ← first checkword repetition in a 32,767 32-state sequence |
| 2 | 4086 | |
| 3 | 26161 | |
| 4 | 23742 | |
| 5 | 30446 | |
| 6 | 32697 | |
| 7 | 10587 | |
| 8 | 7168 | |
| 9 | 16850 | |
| 10 | 23841 | |
| 11 | 14418 | |
| 12 | 23005 | |
| 13 | 24259 | |
| 14 | 15404 | |
| 15 | 255 | |
| 16 | 24640 | |
| 17 | 5748 | |
| 18 | 25788 | |
| 19 | 23862 | |
| 20 | 2402 | |
| 21 | 26674 | |
| 22 | 795 | |
| 23 | 1241 | |
| 24 | 26535 | |
| 25 | 14308 | |
| 26 | 18298 | |
| 27 | 19477 | |
| 28 | 17816 | |
| 29 | 10176 | |
| 30 | 31794 | |
| 31 | 5686 | |
| 32 | 5652 | |

FIG. 18

| number | first repetition | g0 | g1 | g2 | g3=1 |
|---|---|---|---|---|---|
| 1 | 19737 | 5 | 5 | | 0 |
| 2 | 1532 | 5 | 5 | | 1 |
| 3 | 3865 | 5 | 5 | | 2 |
| 4 | 16087 | 5 | 5 | | 3 |
| 5 | 25136 | 5 | 5 | | 4 |
| 6 | 16648 | 5 | 5 | | 5 |
| 7 | 31333 | 5 | 5 | | 6 |
| 8 | 18824 | 5 | 5 | | 7 |
| 9 | 30069 | 5 | 5 | | 8 |
| 10 | 677 | 5 | 5 | | 9 |
| 11 | 15364 | 5 | 5 | | 10 |
| 12 | 967 | 5 | 5 | | 11 |
| 13 | 962 | 5 | 5 | | 12 |
| 14 | 12644 | 5 | 5 | | 13 |
| 15 | 7193 | 5 | 5 | | 14 |
| 16 | 3657 | 5 | 5 | | 15 |
| 17 | 17453 | 5 | 5 | | 16 |
| 18 | 26968 | 5 | 5 | | 17 |
| 19 | 7280 | 5 | 5 | | 18 |
| 20 | 17945 | 5 | 5 | | 19 |
| 21 | 7582 | 5 | 5 | | 20 |
| 22 | 16395 | 5 | 5 | | 21 |
| 23 | 12197 | 5 | 5 | | 22 |
| 24 | 22245 | 5 | 5 | | 23 |
| 25 | 11026 | 5 | 5 | | 24 |
| 26 | 29944 | 5 | 5 | | 25 |
| 27 | 12131 | 5 | 5 | | 26 |
| 28 | 5973 | 5 | 5 | | 27 |
| 29 | 0 | 5 | 5 | | 28 |
| 30 | 4662 | 5 | 5 | | 29 |
| 31 | 549 | 5 | 5 | | 30 |
| 32 | 1844 | 5 | 5 | | 31 |

FIG. 19

```
% 32-state sequence check forward and reverse
te1=0;
de1=0;
be1=1;
out=zeros(1,32767);
restw=zeros(32,8);
restw2=zeros(32,8);
shifts=[31 7 1];
for i0=6:6
        m0=m32(i0,:); % m32 is set of multipliers over GF(32)
    for i1=6:6
        m1=m32(i1,:);
        for i2=1:32
            m2=m321(i2,:); % m321 is set of 32-state inverters shifts=[31 7 1];

for i=1:32767  % generate the sequence
in=shifts(3);
in2=m2(in);
in1=m1(in);
in0=m0(in);

t2=ad32(in2,shifts(2));
t1=ad32(in1,shifts(1));
t0=in0;

out(i)=in;
shifts(3)=t2;
shifts(2)=t1;
shifts(1)=t0;
            end
```

FIG. 21

```
% test from beginning moving to end
outtest=[out out(1:2)]; %the forward extended sequence
fword=seq2dec(out(1:3),32); % the first checkword in radix-32
tel=tel+1;
restw(tel,1)=tel;
restw(tel,3)=tel;
i=3;
while i<32767
    cword=seq2dec(outtest(i:i+2),32); % next checkword radix-32
    rat=(cword==fword); % test checkword to first checkword
    restw(tel,2)=rat*i; % position of the first repetition
    i=i+1; % move one position up
    i=i+rat*32767;   %modify i to jump out of loop
end
restw(tel,4:8)=[9 i0-1 i1-1 i2-1 9]; % store result
% test from end moving to beginning
outtest2=[out(32767) out(32766) out];%extended test sequence
fword2=seq2dec(out(32765:32767),32); %first checkword radix-32
%fword=seq2dec(check,32);
del=del+1;
restw2(del,1)=del;
restw2(del,3)=del;
i=32764; % start of testing
while i>2
    cword2=seq2dec(outtest2(i-2:i),32); % checkword radix-32
    rat2=(cword2==fword2);
    restw2(del,2)=rat2*i;
    i=i-1; % move towards beginning
    i=i-rat2*32767;
end
restw2(del,4:8)=[9 i0-1 i1-1 i2-1 9];
end
end
end
restw(1:32,:)      % test results moving forward
restw2(1:32,:)     % test results moving backwards
```

FIG. 22

| Forward check | | Backward check | |
|---|---|---|---|
| | first repetition | | first repetition |
| 1 | 19737 | 1 | 13033 |
| 2 | 1532 | 2 | 31238 |
| 3 | 3865 | 3 | 28905 |
| 4 | 16087 | 4 | 16683 |
| 5 | 25136 | 5 | 7634 |
| 6 | 16648 | 6 | 16122 |
| 7 | 31333 | 7 | 1437 |
| 8 | 18824 | 8 | 13946 |
| 9 | 30069 | 9 | 2701 |
| 10 | 677 | 10 | 32093 |
| 11 | 15364 | 11 | 17406 |
| 12 | 967 | 12 | 31803 |
| 13 | 962 | 13 | 31808 |
| 14 | 12644 | 14 | 20126 |
| 15 | 7193 | 15 | 25577 |
| 16 | 3657 | 16 | 29113 |
| 17 | 17453 | 17 | 15317 |
| 18 | 26968 | 18 | 5802 |
| 19 | 7280 | 19 | 25490 |
| 20 | 17945 | 20 | 14825 |
| 21 | 7582 | 21 | 25188 |
| 22 | 16395 | 22 | 16375 |
| 23 | 12197 | 23 | 20573 |
| 24 | 22245 | 24 | 10525 |
| 25 | 11026 | 25 | 21744 |
| 26 | 29944 | 26 | 2826 |
| 27 | 12131 | 27 | 20639 |
| 28 | 5973 | 28 | 26797 |
| 29 | 0 | 29 | 0 |
| 30 | 4662 | 30 | 28108 |
| 31 | 549 | 31 | 32221 |
| 32 | 1844 | 32 | 30926 |

FIG. 23

```
function y=npseq(x,p,n)
% determine if all checkwords are unique
% x is sequence; p is wordlength and n is state lent=size(x);
len=lent(2);
test=[x x(1:p-1)];
size(test);
% generate all numbers
base=zeros(1,len+1);

% test all checkwords for i=1:len
    aa=test(i:i+p-1);
    wordv=seq2dec(aa,n);
    base(wordv+1)=1;
end y=len-sum(base);
```

FIG. 24

```
% 32-state sequences using also non-GF(32) inverters
tel=1;
spaan=zeros(32,8);
for i0=5:5
    m0=m32(i0,:); % GF(32) inverter
    for i1=15:15
        m1=m32(i1,:); % GF(32) inverter
        for i2=1:1
            m2=m321(i2,:);   % non GF(32) inverters
shifts=[31 7 1]
i=1;
base=zeros(1,32769);
dase=zeros(1,32767);

while i<32768
in=shifts(3);
in2=m2(in);
in1=m1(in);
in0=m0(in);

t2=ad32(in2,shifts(2)); % ad32 is addition GF(32)
t1=ad32(in1,shifts(1));
t0=in0;

out(i)=in;
    aa=shifts;
    wordv=seq2dec(aa,32);
    dase(i)=(wordv+1);
    base(wordv+1)=base(wordv+1)+1;
    vv=base(wordv+1);
i=i+1;
i=i+(vv~=1)*32769; % stop if repetition occurs
shifts(3)=t2;
shifts(2)=t1;
shifts(1)=t0;

end
            sp=sum(base);
            spaan(tel,:)=[i tel vv sp 9 i0 i1 i2];
            tel=tel+1*(vv==1);
            spaan(1:10,:)
        end
    end
end
```

FIG. 25

```
1    % descramble incoming sequence
2    % with all possible configurations
3    fd=[1 2 2 2;2 1 2 2;2 2 1 2;2 2 2 1];
4    tel=0;
5
6    for i0=2:4
7        m0=m4(i0,:);  % GF(4) inverter
8        for i1=1:4
9            m1=m4(i1,:);  % GF(4) inverter
10           for i2=1:4
11               m2=m4(i2,:);   % GF(4) inverters
12   shifts=[4 4 2];
13
14   for i=1:63
15       in2=m2(shifts(2));
16       in1=m1(shifts(1));
17       in0=m0(out(i));
18
19       t1=sc4(shifts(3),in2);
20       t=sc4(in1,t1);
21       res(i)=fd(in0,t);
22
23       shifts(3)=shifts(2);
24       shifts(2)=shifts(1);
25       shifts(1)=out(i);
26   end
27
28   tel=tel+1;
29   res=res-1;
30   pres=sum(res(4:63));
31   tres(tel,:)=[i0 i1 i2 pres];
32           end
33       end
34   end
```

FIG. 30 tres =

| | | | sum ↓ |
|---|---|---|---|
| 2 | 1 | 1 | 34 |
| 2 | 1 | 2 | 51 |
| 2 | 1 | 3 | 51 |
| 2 | 1 | 4 | 34 |
| 2 | 2 | 1 | 34 |
| 2 | 2 | 2 | 34 |
| 2 | 2 | 3 | 51 |
| 2 | 2 | 4 | 51 |
| 2 | 3 | 1 | 0 ← result |
| 2 | 3 | 2 | 34 |
| 2 | 3 | 3 | 34 |
| 2 | 3 | 4 | 34 |
| 2 | 4 | 1 | 34 |
| 2 | 4 | 2 | 51 |
| 2 | 4 | 3 | 34 |
| 2 | 4 | 4 | 51 |
| 3 | 1 | 1 | 51 |
| 3 | 1 | 2 | 51 |
| 3 | 1 | 3 | 52 |
| 3 | 1 | 4 | 52 |
| 3 | 2 | 1 | 51 |
| 3 | 2 | 2 | 52 |

FIG. 31

| number | flat | mul | inv2 | inv3 |
|---|---|---|---|---|
| 49 | 1 | 2 | 6 | 41 |
| 50 | 0 | 2 | 6 | 43 |
| 51 | 1 | 2 | 6 | 52 |
| 52 | 0 | 2 | 6 | 64 |
| 53 | 1 | 2 | 6 | 103 |
| 54 | 1 | 2 | 6 | 126 |
| 55 | 1 | 2 | 6 | 131 |
| 56 | 0 | 2 | 6 | 139 |
| 57 | 1 | 2 | 6 | 154 |
| 58 | 0 | 2 | 6 | 167 |
| 59 | 0 | 2 | 6 | 170 |
| 60 | 1 | 2 | 6 | 205 |
| 61 | 0 | 2 | 6 | 208 |
| 62 | 1 | 2 | 6 | 216 |
| 63 | 0 | 2 | 6 | 248 |
| 64 | 0 | 2 | 6 | 254 |

FIG. 32

| | | | | |
|---|---|---|---|---|
| m1 | 0 | 0 | 0 | 0 |
| m2 | 0 | 1 | 2 | 3 |
| m3 | 0 | 2 | 3 | 1 |
| m4 | 0 | 3 | 1 | 2 |

FIG. 33

| number | | 4-state inverters | | | |
|---|---|---|---|---|---|
| 4-state inverters | | | | | |
| 6 | 9 | 0 | 0 | 1 | 1 |
| 41 | 9 | 0 | 2 | 2 | 0 |
| 43 | 9 | 0 | 2 | 2 | 2 |
| 52 | 9 | 0 | 3 | 0 | 3 |
| 64 | 9 | 0 | 3 | 3 | 3 |
| 103 | 9 | 1 | 2 | 1 | 2 |
| 126 | 9 | 1 | 3 | 3 | 1 |
| 131 | 9 | 2 | 0 | 0 | 2 |
| 139 | 9 | 2 | 0 | 2 | 2 |
| 154 | 9 | 2 | 1 | 2 | 1 |
| 167 | 9 | 2 | 2 | 1 | 2 |
| 170 | 9 | 2 | 2 | 2 | 1 |
| 205 | 9 | 3 | 0 | 3 | 0 |
| 208 | 9 | 3 | 0 | 3 | 3 |
| 216 | 9 | 3 | 1 | 1 | 3 |
| 248 | 9 | 3 | 3 | 1 | 3 |
| 254 | 9 | 3 | 3 | 3 | 1 |

FIG. 34

| number | flat | mul | inv2 | inv3 |
|--------|------|-----|------|------|
| 499 | 1 | 3 | 41 | 96 |
| 500 | 0 | 3 | 41 | 107 |
| 501 | 0 | 3 | 41 | 133 |
| 502 | 0 | 3 | 41 | 139 |
| 503 | 0 | 3 | 41 | 153 |
| 504 | 0 | 3 | 41 | 156 |
| 505 | 0 | 3 | 41 | 166 |
| 506 | 0 | 3 | 41 | 168 |
| 507 | 1 | 3 | 41 | 171 |
| 508 | 0 | 3 | 41 | 197 |
| 509 | 0 | 3 | 41 | 209 |
| 510 | 1 | 3 | 41 | 246 |

1101

METHODS AND SYSTEMS FOR DETERMINING CHARACTERISTICS OF A SEQUENCE OF N-STATE SYMBOLS

RELATED CASES

This application claims the benefit of U.S. Provisional Application Ser. No. 61/674,932 filed on Jul. 24, 2012 which is incorporated herein by reference in its entirety.

BACKGROUND OF THE INVENTION

This invention relates methods and system to detect characteristics of a sequence of n-state symbols with n=2 and n>2. More specifically, it relates to detect if a sequence is a pseudo-random maximum length sequence of n-state symbols.

Sequences of symbols have obtained an increased significance in electronic applications such as telecommunications, cryptology and security. A sequence is defined herein as a series of n-state symbols, wherein a symbol is represented by one or more signals, wherein the one or more signals represent one of n states with either n=2 for binary symbols and n>2 for non-binary symbols. The sequences can be generated from reading a storage medium to create the signals that represent the symbols or by generating the symbols from signal processing devices such as Linear Feedback Shift Registers (LFSRs).

In many cases, it is important to use sequences of n-state symbols that have a characteristic of a pseudo-noise (PN) or maximum-length (ML) sequence. In the binary case one generally determines the auto-correlation of the sequence and one derives from the auto-correlation if the sequence is a PN or ML sequence. In n-state cases with n>2 the auto-correlation graph of an n-state sequence of symbols will show side lobes, which may make it difficult to assess to graphically assess if the sequence is an ML sequence.

Accordingly, novel and improved non-graphical methods and systems are required to assess if a sequence or a part of a sequence is Maximum Length.

SUMMARY OF THE INVENTION

In view of the more limited possibilities of the prior art novel and improved methods and apparatus for generating n-state symbol sequences with n=2 and n>2 and for determining a property of a sequence of n-state symbols are provided.

In accordance with an aspect of the present invention a method is provided for testing a property of a sequence of at least k n-state symbols with n an integer greater than 1 and k an integer greater than 2, an n-state symbol being represented by a signal, comprising generating n-state symbols in the sequence with an n-state Linear Feedback Shift Register (LFSR) with p n-state shift register elements with a content of p n-state symbols on an output of the n-state LFSR and comparing a content of the p n-state shift registers with a previous content of the p n-state shift registers during generating the sequence of n-state symbols to decide to generate the next symbol in the sequence of n-state symbols.

In accordance with another aspect of the present invention a method is provided, wherein n=2.

In accordance with yet another aspect of the present invention a method is provided, wherein n>2.

In accordance with yet another aspect of the present invention a method is provided, further comprising stopping generating the sequence of n-state symbols when a repeat of a previously occurring content of the p n-state shift registers is detected.

In accordance with yet another aspect of the present invention a method is provided, further comprising, providing by a processor of a mark of a first occurrence of a repeat of a shift register content of the n-state LFSR related to a start of the sequence.

In accordance with yet another aspect of the present invention a method is provided, wherein, the content of the p n-state shift register elements is unique for generating at least $n^p-1$ n-state symbols in the sequence of n-state symbols.

In accordance with yet another aspect of the present invention a method is provided, wherein a correlation graph of the sequence of n-state symbols is flat with a single peak.

In accordance with yet another aspect of the present invention a method is provided, wherein a correlation graph of the sequence of n-state symbols is not flat with a single peak.

In accordance with yet another aspect of the present invention a method is provided, wherein a configuration of the n-state LFSR contains a function that can be expressed as a reversible n-state logic function modified in accordance with at least one n-state inverter not being a multiplication over GF(n).

In accordance with yet another aspect of the present invention a method is provided, further comprising placing the configuration in a catalog of sequence generators.

In accordance with yet another aspect of the present invention a method is provided, further comprising receiving the sequence of k n-state symbols by a processor, forming by the processor of a plurality of checkwords from the k n-state symbols and determining if a checkword in the plurality of checkwords is repeated.

In accordance with yet another aspect of the present invention a method is provided, wherein the processor decides that the sequence of n-state symbols is a maximum length sequence.

In accordance with a further aspect of the present invention a system is provided to determine a property of a sequence of k n-state symbols with n greater than 2 and k>2, comprising a memory enabled to store data in and to retrieve data from including instructions, a processor enabled to execute instructions to perform the steps: generating n-state symbols in the sequence with a first n-state Linear Feedback Shift Register (LFSR) with p with p>1 n-state shift register elements with a content of p n-state symbols on an output of the n-state LFSR, a configuration of the n-state LFSR being determined by at least a one n-state inverter not being a multiplier over GF(n) comparing the content of the p n-state shift registers with a previous content of the p n-state shift registers generated during generating the sequence of n-state symbols to decide to generate the next symbol in the sequence of n-state symbols.

In accordance with yet a further aspect of the present invention a system is provided, further comprising stopping generating the sequence of n-state symbols when a repeat of a previously occurring content of the p n-state shift registers is detected.

In accordance with yet a further aspect of the present invention a system is provided, further comprising the processor initiating a second n-state Linear Feedback Shift Register (LFSR) with p with p>1 n-state shift register elements to generate another sequence of n-state symbols.

In accordance with yet a further aspect of the present invention a system is provided, wherein the content of the p n-state shift register elements is unique for generating at least $n^p-1$ n-state symbols in the sequence of n-state symbols.

In accordance with yet a further aspect of the present invention a system is provided, further comprising receiving the sequence of n-state symbols by a second processor, forming by the second processor of a plurality of checkwords from the n-state symbols, and determining if a checkword in the plurality of checkwords is repeated.

In accordance with another aspect of the present invention a method is provided to determine a property of a sequence of k n-state symbols with a processor with n equal to or greater than 2 and k>1, comprising: forming by the processor of a plurality of checkwords of p n-state symbols from the k n-state symbols with p>1; and determining if a checkword in the plurality of checkwords is repeated.

In accordance with yet another aspect of the present invention a method is provided, wherein n>2.

In accordance with yet another aspect of the present invention a method is provided, wherein at least k−p+1 checkwords in the plurality of checkwords are unique.

In accordance with an aspect of the present invention a method is provided for testing a property of a sequence of at least k n-state symbols with n an integer greater than 1 and k an integer greater than 2, an n-state symbol being represented by a signal, comprising: a processor generating n-state symbols in the sequence by a sequence generator that is defined by an n-state feedback shift register of p n-state shift register elements and at least one n-state switching function, wherein each generated n-state symbol corresponds with a content of the shift register of p n-state symbols and p is an integer greater than 1 and the processor comparing the shift register content of p n-state symbols with a previous content of the shift register of p n-state symbols corresponding with generating a previous n-state symbol in the sequence of n-state symbols to decide to generate the next symbol in the sequence of n-state symbols.

In accordance with a further aspect of the present invention a method is provided, wherein n>2.

In accordance with yet a further aspect of the present invention a method is provided, further comprising: the processor stopping generating the sequence of n-state symbols after a repeat of the previous content of the p n-state shift registers is detected.

In accordance with yet a further aspect of the present invention a method is provided, further comprising: the processor reconfiguring a configuration of the n-state feedback shift register defined sequence generator and initializing the shift register and restarting the generation of the sequence of n-state symbols.

In accordance with yet a further aspect of the present invention a method is provided, further comprising detecting by the processor of a first occurrence of a repeat of the previous shift register content related to a start of the sequence.

In accordance with yet a further aspect of the present invention a method is provided, wherein the n-state feedback shift register defined sequence generator generates $n^p-1$ n-state symbols in the sequence of n-state symbols without repeating any content of the shift register.

In accordance with yet a further aspect of the present invention a method is provided, further comprising: placing a configuration of the n-state feedback shift register defined sequence generator in a catalog of sequence generators.

In accordance with yet a further aspect of the present invention a method is provided, wherein the comparing is performed by comparing representative values of contents of the shift register.

In accordance with yet a further aspect of the present invention a method is provided, further comprising: receiving the sequence of k n-state symbols by a second processor, the second processor creating a plurality of checkwords from the k n-state symbols and the second processor determining if a checkword in the plurality of checkwords is repeated.

In accordance with another aspect of the present invention a system is provided to determine a property of a sequence of k n-state symbols with n equal to or greater than 2 and k>2, comprising: a memory enabled to store data in and to retrieve data from including instructions, a processor enabled to execute instructions to perform the steps: generating n-state symbols in the sequence by a sequence generator that is defined by an n-state feedback shift register of p n-state shift register elements and at least one n-state switching function, wherein each generated n-state symbol corresponds with a content of the shift register of p n-state symbols and p is an integer greater than 1 and comparing the shift register content of p n-state symbols with a previous content of the shift register of p n-state symbols corresponding with generating a previous n-state symbol in the sequence of n-state symbols to decide to generate the next symbol in the sequence of n-state symbols.

In accordance with yet another aspect of the present invention a system is provided, wherein n>2.

In accordance with yet another aspect of the present invention a system is provided, further comprising: the processor stopping generating the sequence of n-state symbols after a repeat of the previous content of the p n-state shift registers is detected.

In accordance with yet another aspect of the present invention a system is provided, wherein further comprising: the processor reconfiguring a configuration of the n-state feedback shift register defined sequence generator and initializing the shift register and restarting the generation of the sequence of n-state symbols.

In accordance with yet another aspect of the present invention a system is provided, further comprising, detecting by the processor of a first occurrence of a repeat of the previous shift register content related to a start of the sequence.

In accordance with yet another aspect of the present invention a system is provided, wherein the n-state feedback shift register defined sequence generator generates $n^p-1$ n-state symbols in the sequence of n-state symbols without repeating any content of the shift register.

In accordance with yet another aspect of the present invention a system is provided, further comprising: a second processor enabled to execute instructions to perform the steps: receiving signals representing the sequence of k n-state symbols, creating a plurality of checkwords from the k n-state symbols and determining if a checkword in the plurality of checkwords is repeated.

In accordance with a further aspect of the present invention a method is provided, to determine with a processor a property of a sequence of k n-state symbols with n equal to or greater than 2 and k>1 and an n-state symbol is represented by a signal, comprising: forming by the processor of a plurality of checkwords of p n-state symbols from the k n-state symbols with p>1 and determining if a checkword in the plurality of checkwords is repeated.

In accordance with yet a further aspect of the present invention a method is provided, wherein n>2.

In accordance with yet a further aspect of the present invention a method is provided, wherein: k checkwords in the plurality of checkwords are unique.

In accordance with yet a further aspect of the present invention a method is provided, wherein a first checkword and a second checkword of p n-state symbols have (p−1) symbols in common.

BRIEF DESCRIPTION OF THE DRAWINGS

Various other objects, features and attendant advantages of the present invention will become fully appreciated as the same becomes better understood when considered in conjunction with the accompanying drawings, and wherein:

FIG. 6 illustrates steps to run various configurations of a binary sequence generator in accordance with at least an aspect of the present invention;

FIG. 7 illustrates a plurality of binary sequences generated in accordance with at least an aspect of the present invention;

FIG. 8 illustrates a plurality of sequence generator configurations in accordance with at least an aspect of the present invention;

FIGS. 9A-9H illustrate a plurality of sequence generator configurations in accordance with at least an aspect of the present invention;

FIG. 14 illustrates steps performed in Matlab script in accordance with various aspects of the present invention;

FIG. 15 illustrates results of testing sequences of n-state symbols in accordance with various aspects of the present invention;

FIGS. 18 and 19 illustrate results of testing sequences of n-state symbols in accordance with various aspects of the present invention;

FIGS. 21 and 22 illustrate steps performed in Matlab script in accordance with various aspects of the present invention;

FIG. 23 illustrates results of testing sequences of n-state symbols in accordance with various aspects of the present invention;

FIGS. 24 and 25 illustrate steps performed in Matlab script in accordance with various aspects of the present invention;

FIG. 30 illustrates steps performed in Matlab script in accordance with various aspects of the present invention;

FIGS. 31 and 32 illustrate results of testing sequences of n-state symbols in accordance with various aspects of the present invention;

FIG. 33 illustrate multipliers over GF(4);

FIG. 34 illustrates various 4-state inverters provided in accordance with at least an aspect of the present invention;

DETAILED DESCRIPTION OF THE INVENTION

Figure 1:
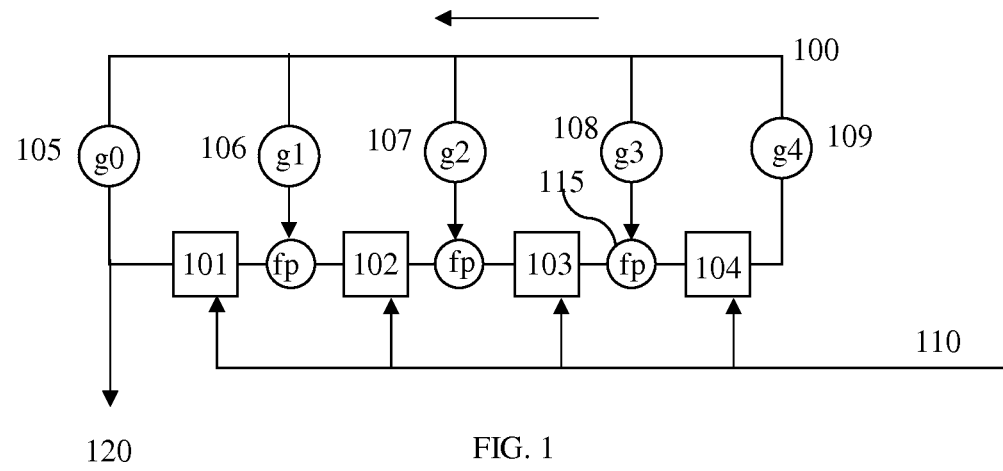
FIGS. 1 and 2 illustrate Linear Feedback Shift Registers (LFSRs)

The PN (pseudo-noise) sequences that are analyzed herein is accordance with one aspect of the present invention are at least part of an n-state maximum length sequence that can be generated by an n-state Linear Feedback Shift Register (n-state LFSR) with k n-state shift register elements. These sequences are generally characterized by a irreducible polynomial over a finite field (Galois Field) GF(n), hence the n-state, of degree k. This means that the complete n-state ML PN sequence has $n^k-1$ symbols with a predefined distribution of symbols, usually defined by one or more correlation functions.

A designer of a system may be faced with one of two problems: (a) a sequence of n-state symbols is received and it has to be determined easily if that sequence is at least part of an n-state ML sequence; or (b) a device such as an LFSR can be set in one of many configurations, for instance including different multipliers corresponding to coefficients in the irreducible polynomials. Without going through the actual polynomials one wants to check the characteristics of the sequences to select a desirable sequence generator.

It is noted that the n-state symbols are intended and enabled to be processed by physical devices, such as receivers, processors and data storage devices or any other device that is enabled to process the signals representing the n-state symbols. It is further pointed out that n-state symbols with n being an integer n=2 in one embodiment of the present invention or n>2 in another embodiment of the present invention, herein are represented by one or more signals that are processed by a device. For brevity herein, the term "processing of symbols" is used. In all cases this is intended to mean processing with a device or a processing device one or more signals representing a symbol.

In one embodiment of the present invention, signals representing a sequence of binary or non-binary are received and processed by a device, which may be an electronic device, at a rate of at least 100 discrete signals per second. In one embodiment of the present invention, signals representing a sequence of binary or non-binary are received and processed by a device, which may be an electronic device, at a rate of at least 1000 discrete signals per second. In one embodiment of the present invention, signals representing a sequence of binary or non-binary are received and processed by a device, which may be an electronic device, at a rate of at least 10,000 discrete signals per second. In one embodiment of the present invention, signals representing a sequence of binary or non-binary are received and processed by a device, which may be an electronic device, at an equivalent rate of at least 100 n-state symbols per second, wherein n=2 or n>2. In one embodiment of the present invention, signals representing a sequence of binary or non-binary are received and processed by a device, which may be an electronic device, at an equivalent rate of at least 1000 n-state symbols per second, wherein n=2 or n>2. In one embodiment of the present invention, signals representing a sequence of binary or non-binary are received and processed by a device, which may be an electronic device, at an equivalent rate of at least 100,000 n-state symbols per second, wherein n=2 or n>2.

A sequence of symbols can be represented as a vector [a1 a2 a3 a4 a5 . . . ak] of k n-state symbols, wherein each symbol has one of n states. In the binary case this means that each symbol has one of two states, for instance 0 or 1. It is common to use as a set of n-state symbols the set [0, 1, 2, 3, . . . (n−1)]

using the set of consecutive integers with 0 being the lowest state. Because symbols are represented by signals, which may be characterized by a physical phenomenon with other values than [0, 1, 2, 3, . . . (n−1)], it should be apparent that any other representation of symbols may be used, including letters, other symbols or colors or the like.

One may also use other and for instance non-consecutive integers such as [2, 7, 11, . . . etc] to indicate the n states, as long as each of the n states is different from any other of the n states.

Herein, primarily the designation [0, 1, 2, . . . , (n−1)] will be used for the n states.

FIG. 1 and illustrate n-state Linear Feedback Shift Register (LFSR) 100 with n≥2 (which means n equal to 2 or binary or n greater than 2) in Galois configuration. The LFSR, as an illustrative example, has 4 shift register elements 101, 102, 103 and 104 (k=4) each enabled to receive, hold and provide an n-state symbol. Symbols shifts from left to right.

An n-state symbol herein is represented by one or more signals. For instance, for n=2, a symbol is represented by a binary signal that assumes one of 2 states. For n=4, a symbol may be represented by a 4-state signal enabled to assume one of 4 states. In one embodiment of the present invention an n-state symbol such as a 4-state symbol is represented by a plurality of binary signals. Thus, a 4-state symbol is represented in that case by 2 bits or by 2 binary symbols. This requires that a 4-state shift register element can hold and shift 2 bits. The datapath for a 4-state signal in a 4-state LFSR in that case is able to conduct 2 bits per clock cycle, either in a parallel or a sequential manner.

The n-state Galois LFSR has between the shift register elements a connecting n-state reversible function fp 115. The function fp is defined by an n-state truth table, which shows a state of an output as a result of an n-state input signal on each of two inputs. The truth table shows the output state for each possible combination of n-state input signals on the two inputs. There are n*n possible input combinations, each resulting in an output state. For that reason, the truth table is called an n by n n-state truth table.

The function fp in the binary case is usually the XOR function, though the EQUALITY function can also be used, or a mixture of XOR (≠) and EQUALITY (=) functions. The following tables show the 2 by 2 binary truth tables for the XOR and the EQUALITY function.

| XOR | 0 | 1 | EQUALITY | 0 | 1 |
|---|---|---|---|---|---|
| 0 | 0 | 1 | 0 | 1 | 0 |
| 1 | 1 | 0 | 1 | 0 | 1 |

In the binary case the feedback from last shift register element into the LFSR is provided by connections 105, 106, 107, 108 and 109. For the LFSR to work for all shift register elements g0 (105) and g4 (109) have always to be connected. In general terms g0 and the like are considered to be multipliers. For the binary case that means that the multiplier is a 0 (open) or a 1 (connected).

While considering g0-g4 as multipliers is allowed it excludes some important other possibilities. Thus, the factors g0-g4 are herein to be considered as n-state inverters. The following table shows the truth table for the binary case.

| OPEN | | CONNECTED | | INVERT | |
|---|---|---|---|---|---|
| 0 | 0 | 0 | 0 | 0 | 1 |
| 1 | 0 | 1 | 1 | 1 | 0 |

In the OPEN case all states are always 0. In the CONNECTED case a state is passed through. In the INVERT case the logic or switching state is inverted. Another binary inverter is "always 1" which generates state 1 on the output, no matter what the input state is.

The LFSR of FIG. 1 operates in an autonomous manner. That is, based on an initial state of 101-104 the next states follow in a predetermined way. An LFSR operates under a clock signal which is shown as 110. While not always shown, a clock signal is always assumed to be applied appropriately in an LFSR.

The state of the LFSR is read from LFSR elements 101, 102, 103 and 144.

It is known that an LFSR 100 is (in some configuration of g0-g4) a maximum length sequence generator. This means that the output 120 of the LFSR can produce a maximum-length sequence $n^k-1$, depending on the number of clock pulses. An n-state shift register of p shift register elements in the correct configuration produces a maximum-length sequence of $n^p-1$ n-state symbols. The LFSR itself in the correct configuration produces $n^p-1$ different shift register states before it repeats.

A classic LFSR always has one forbidden or degenerative state in which it gets stuck. In the binary case with fp is a XOR function that state is an all 0 state. This forbidden state is different when other functions and/or INVERT inverters are used.

Assume [g0 g1 g2 g3 g4]=[1 0 0 1 1] in a binary LFSR wherein fp is a XOR function. This will create a maximum length generator. Assume an initial LFSR state [1 0 0 1]. The following table shows that after 15 states the same state of the LFSR reoccurs.

| GALOIS LFSR state | | | | value | no. |
|---|---|---|---|---|---|
| 1 | 0 | 0 | 1 | 9 | 1 |
| 1 | 1 | 0 | 1 | 13 | 2 |
| 1 | 1 | 1 | 1 | 15 | 3 |
| 1 | 1 | 1 | 0 | 14 | 4 |
| 0 | 1 | 1 | 1 | 7 | 5 |
| 1 | 0 | 1 | 0 | 10 | 6 |
| 0 | 1 | 0 | 1 | 5 | 7 |
| 1 | 0 | 1 | 1 | 11 | 8 |
| 1 | 1 | 0 | 0 | 12 | 9 |
| 0 | 1 | 1 | 0 | 6 | 10 |
| 0 | 0 | 1 | 1 | 3 | 11 |
| 1 | 0 | 0 | 0 | 8 | 12 |
| 0 | 1 | 0 | 0 | 4 | 13 |
| 0 | 0 | 1 | 0 | 2 | 14 |
| 0 | 0 | 0 | 1 | 1 | 15 |
| 1 | 0 | 0 | 1 | 9 | 1 |

The state [0 0 0 0] is missing from being generated by the LFSR, being the forbidden state. The sequence that is generated in 15 cycles is [1 1 1 0 1 0 1 1 0 0 1 0 0 0 1] which is a binary ML sequence.

Figure 2:
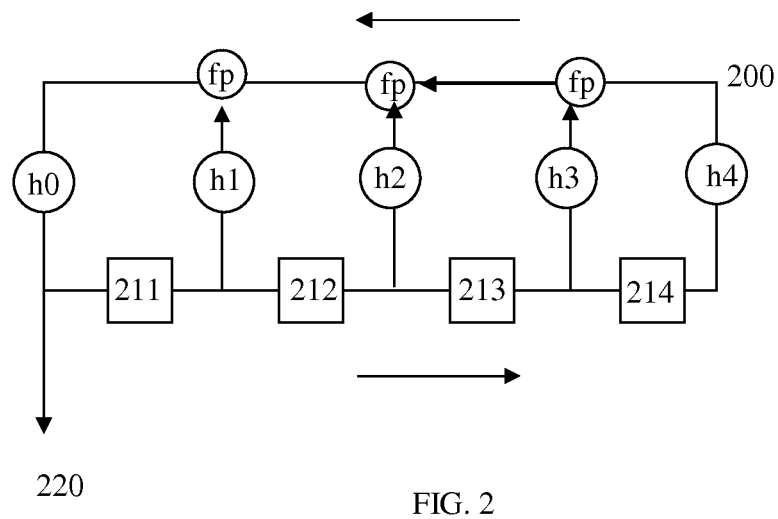

FIG. 2 illustrates an n-state LFSR 200 in Fibonacci configuration with shift register element outputs 211, 212, 213 and 214 and with binary inverters [h0 h1 h2 h3 h4]. For the binary case [h0 h1 h2 h3 h4]=[1 0 0 1 1] wherein fp is a XOR function and an initial LFSR state [1 0 0 1] the following LFSR states are generated.

| FIB LFSR state | | | | value | no |
|---|---|---|---|---|---|
| 1 | 0 | 0 | 1 | 9 | 1 |
| 1 | 1 | 0 | 0 | 12 | 2 |
| 0 | 1 | 1 | 0 | 6 | 3 |
| 1 | 0 | 1 | 1 | 11 | 4 |
| 0 | 1 | 0 | 1 | 5 | 5 |

| FIB LFSR state | | | | value | no |
|---|---|---|---|---|---|
| 1 | 0 | 1 | 0 | 10 | 6 |
| 1 | 1 | 0 | 1 | 13 | 7 |
| 1 | 1 | 1 | 0 | 14 | 8 |
| 1 | 1 | 1 | 1 | 15 | 9 |
| 0 | 1 | 1 | 1 | 7 | 10 |
| 0 | 0 | 1 | 1 | 3 | 11 |
| 0 | 0 | 0 | 1 | 1 | 12 |
| 1 | 0 | 0 | 0 | 8 | 13 |
| 0 | 1 | 0 | 0 | 4 | 14 |
| 0 | 0 | 1 | 0 | 2 | 15 |
| 1 | 0 | 0 | 1 | 9 | 1 |

One can see that though the Fibonacci LFSR 200 of FIG. 2 starts with the same initial state as the Galois LFSR the consecutive states are different. The sequence generated on output 220 in 15 clock-cycles is [1 0 0 1 1 0 1 0 1 1 1 1 0 0 0] and is also an ML sequence.

As a further example, assume that one has a p element binary LFSR, either in Galois or in Fibonacci configuration, with which one wants to generate a binary ML sequence of $2^p-1$ bits. The approach is a generic LFSR, with inverters [g0 g1 g2 g3 g4] or [h0 h1 h2 h3 h4] and binary functions fp being the XOR or EQUAL function. One generates the sequences for different configurations and then checks if the sequence is ML.

One way to check in the binary case the ML properties of a sequence is to generate the auto-correlation and for instance present it in a graph for analysis, though one can also analyze the result numerically. It is known that the auto-correlation of a binary sequence has one distinguishing peak and for the rest all the correlation values are identical but different from the peak. A correlation graph of the sequences generated by the LFSRs of FIGS. 1 and 2 are illustrated in FIG. 3.

The correlation between two sequences of equal length herein are generated as follows: Assume a first sequence $[a_0 \ a_1 \ a_2 \ a_3 \ a_4 \ldots a_{r-1} \ a_r]$ and a second sequence $[b_0 \ b_1 \ b_2 \ b_3 \ b_4 \ldots b_{r-1} \ b_r]$. Herein $r=n^p-1$, with n the number of states and p the number of shift register elements in the LFSR. Take the second sequence and create the correlation sequence: $[b_1 \ b_2 \ b_3 \ b_4 \ldots b_{r-1} \ b_r \ b_0 \ b_1 \ b_2 \ b_3 \ b_4 \ldots b_{r-1} \ b_r \ b_0 \ b_1 \ b_2 \ b_3 \ b_4 \ldots b_{r-1}]$. Next, compare for each or 2*r−1 positions in the correlation sequence, starting at the first b1 and ending at the last br, the corresponding symbols between $[a_0 \ a_1 \ a_2 \ a_3 \ a_4 \ldots a_{r-1} \ a_r]$ and the partial sequence starting at the defined position. This method is described in commonly owned US Patent Application Pub. No. 20090285326 published on Nov. 19, 2009 and commonly owned U.S. Pat. No. 7,580,472 issued on Aug. 25, 2009, which are both incorporated herein by reference.

Figure 4:
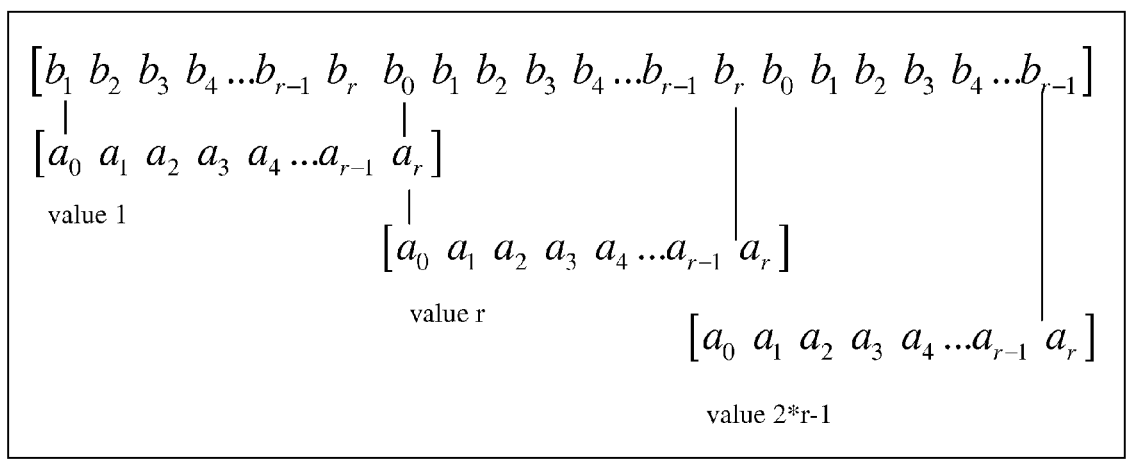
FIG. 4 illustrates steps to determine a correlation of a sequence of n-state symbols.

The correlation process is illustrated in FIG. 4. One may imagine that the sequence $[a_0 \ a_1 \ a_2 \ a_3 \ a_4 \ldots a_{r-1} \ a_r]$ is compared with all consecutive sequences of equal length in $[b_1 \ b_2 \ b_3 \ b_4 \ldots b_{r-1} \ b_r \ b_0 \ b_1 \ b_2 \ b_3 \ b_4 \ldots b_{r-1} \ b_r \ b_0 \ b_1 \ b_2 \ b_3 \ b_4 \ldots b_{r-1}]$. When the two sequences are compared the following takes place: when a symbol in the first sequence is identical to a symbol in the second sequence in a corresponding position a fixed value is added to a sum. This step is performed for all symbols in $[a_0 \ a_1 \ a_2 \ a_3 \ a_4 \ldots a_{r-1} \ a_r]$ for each sequence comparison. When symbols are not identical either nothing is changed in the sum or a fixed value is subtracted. However, what is added to a sum or subtracted from the sum is independent of the state of the symbol. This means that if 15 symbols in one sequence are identical to 15 symbols in the other sequence, value r in FIG. 4 if the correlation sequence is an auto-correlation, then the sum value, starting from 0 at a comparison is 15.

Figure 3:
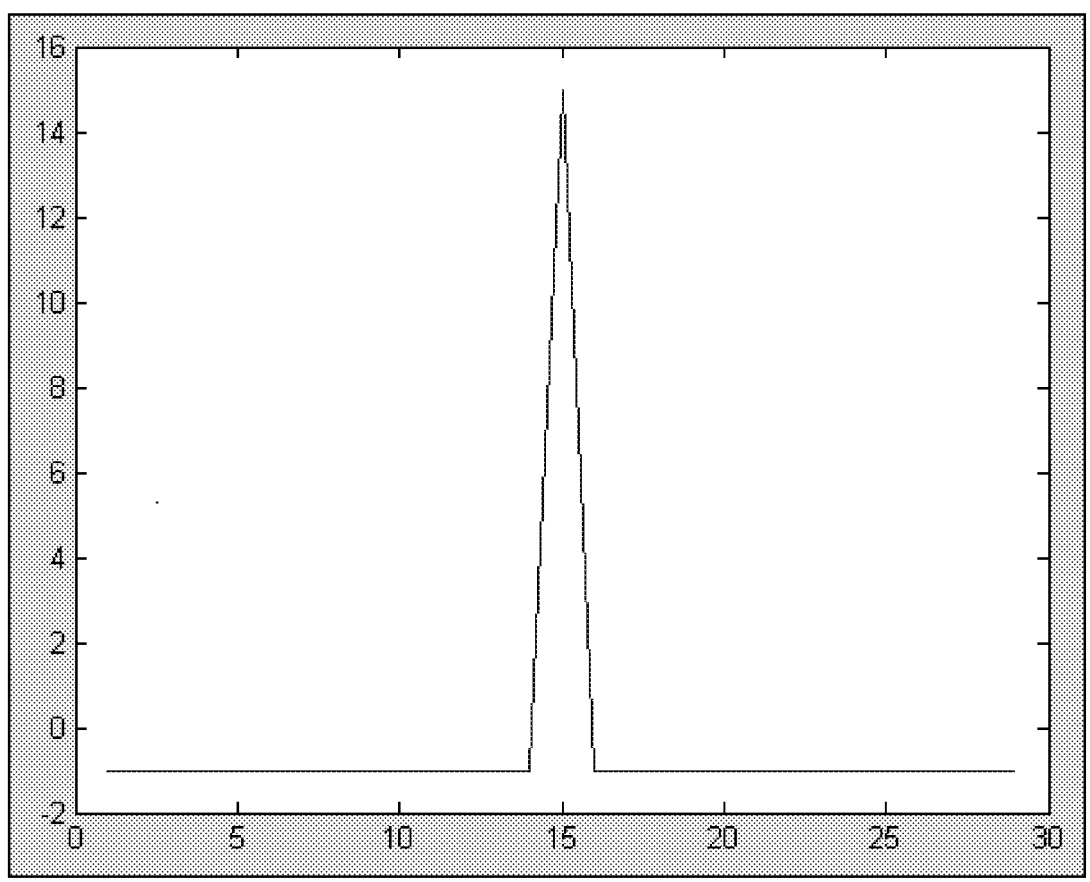
FIG. 3 illustrates a correlation graph of a sequence of n-state symbols.

A property of a binary sequence being an ML sequence is that its auto-correlation graph always has a shape similar to FIG. 3. The triangle shape is because of Matlab's way of drawing curves. In reality, the graph has one peak and all other values are lower. One can inverse the peak by adding a negative number if symbols are identical.

Accordingly, one can use a p-stage binary LFSR to generate a sequence of $2^p-1$ symbols and check the shape of the related auto-correlation graph.

Figure 5:
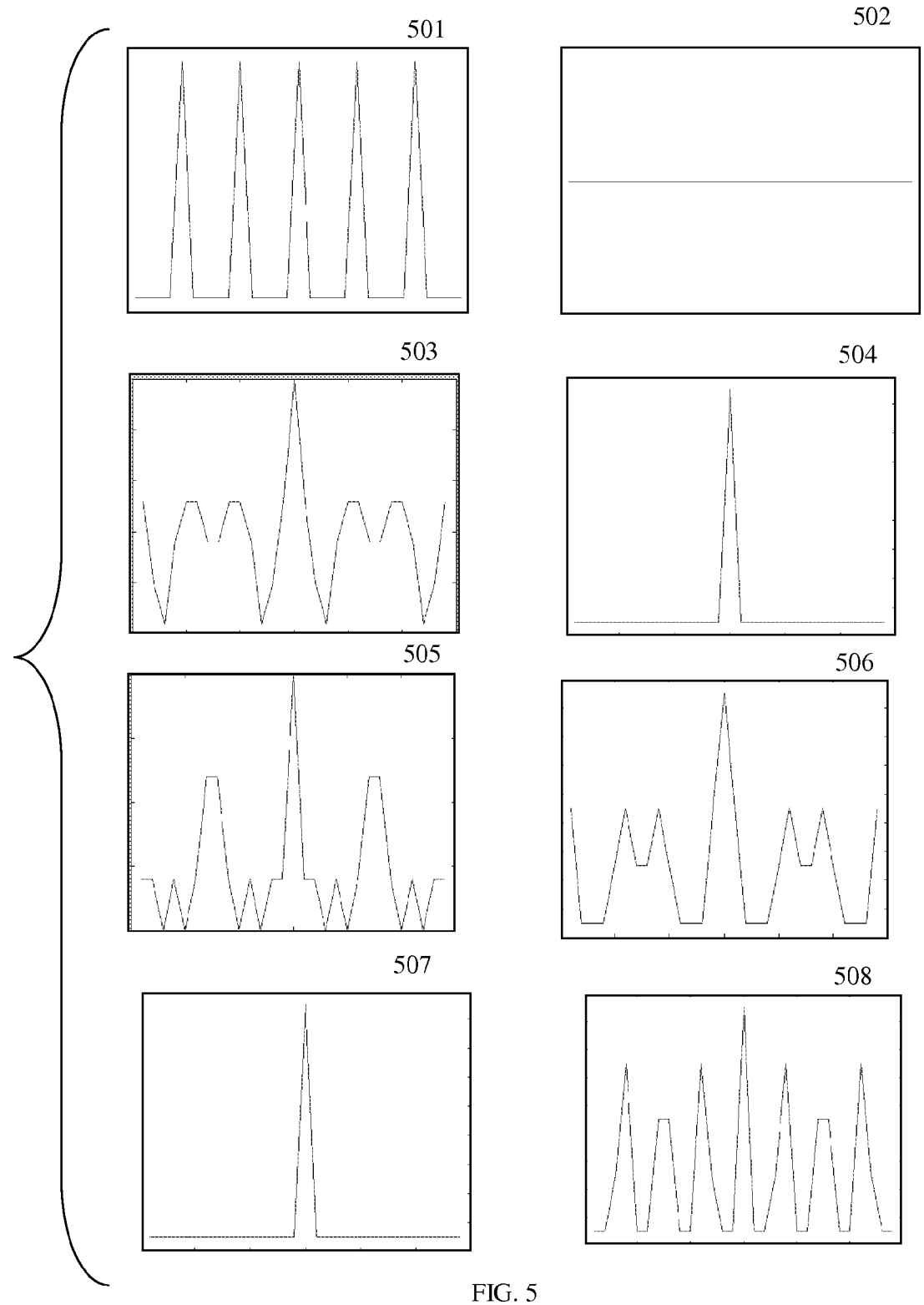
FIG. 5 illustrates various correlation graphs.

FIG. 5 in graphs 501-508 shows the 8 correlation graphs from the 15 symbol sequences generated by 8 different inverter based configurations of the generator of FIG. 1. Clearly, different types of 15 bit sequences are being generated and only the configurations corresponding to graphs 504 and 507 are ML sequence generators. Graph 502 shows a graph of a degenerated state of the generator in that configuration. The listing of the Matlab script that generates the sequences is shown in FIG. 6. The correlation in accordance with the method of FIG. 4 is performed by the statement ccf3 mod(out,out) on line 27 of FIG. 6.

FIGS. 7 and 8 further illustrate the different sequences and their generators. FIG. 7 provides the numbered sequences (numbered 1 through 8) and the generated binary sequence. FIG. 8 illustrates in a table for each numbered sequence the initial and final shift register content and the inverters in the configurations inv1, inv2 and inv3 corresponding with g1, g2 and g3 in FIG. 1. A value 0 means the tap in unconnected and a value 1 means a connected tap. It is noted that one could also include a true inverter [1 0] to further vary the number of configurations. The 9 in the tables is used as a separator with no further meaning.

There is yet another method to determine the characteristic of the generated sequence, based on the generated shift register contents. If the shift register content of each of the consecutive 15 states is different from any other shift register state, then the generated sequence is a maximum length n-state sequence of length $n^p-1$. This was illustrated (partially) above in the tables of intermediate shift register states for the Fibonacci and the Galois ML sequence generators. However, one also needs to show that all other configurations will have at least one duplication of a previous shift register state during the generation of the sequences.

This is illustrated in the tables 901-908 in FIGS. 9A-9H. Herein the decimal values corresponding to a 4 bit shift register content are generated and placed in the tables. One can easily check that only tables 904 and 907 have unique shift register contents, thus corresponding to a maximum length sequence correlation graph as illustrated in graphs 504 and 507 of FIG. 5. All other shift registers show some repetition in content during the $n^p-1$ consecutive generating cycles.

One advantage of the method of checking the content of the shift register is that one can check the content during the generation process and one can stop the process as soon as a repetition has been detected. An unexpected benefit compared to the generation of a correlation graph or correlation values is that one does not have to generate the complete sequence to check the ML property and one can stop the generation as soon as a repetition has been detected, if the purpose is to generate only an ML sequence. Accordingly, the checking and comparing of shift register contents during generation of an n-state sequence allows to determine the sequence generator and thus the generated n-state sequence to be not maximum length prior to having generated the complete sequence of $n^p-1$ n-state symbols. The above applies to any n-state sequence generation, be it to binary or n-state with n>2 or to Galois or Fibonacci configurations.

In accordance with a further aspect of the present invention next a method is provided that allows to assess an ML status of a sequence based on analysis of parts of the sequence. For instance an n-state sequence of at least $n^p-1$ n-state symbols is provided. To determine the usefulness of such a sequence one wants to check if the sequence or part of the sequence is maximum length. The maximum length property of an n-state sequence is defined above by its correlation properties or the properties of the related correlation graph by using the correlation as illustrated in FIG. 4.

It is assumed that one knows what n is (binary or n>2) and the related number of shift register elements of the originating generator.

The approach to take is a processor to take a number of p consecutive symbols of the sequence for evaluation. A number of k consecutive symbols in a sequence is called the checkword herein. The checkword thus has k symbols which in one embodiment of the present invention may be p symbols which is identical to the number of shift register elements in an LFSR that determines the sequence. In one embodiment of the present invention k may be greater than p. In yet a further embodiment of the present invention, fewer than $n^p-1$ words need to be compared to have a processor determine that the sequence is not an ML sequence.

It is one property of Fibonacci LFSR generated n-state sequences that the content of the shift register is reflected with delay into the generated sequence of n-state symbols. One can see that from FIG. 2 with h0=1, which inputs the generated n-state symbol back into the shift register. With h0 not equal to 1 that effect is merely further delayed. Accordingly, the sequence of symbols in overlapping checkwords of p symbols with an overlap of (p-1) symbols reflects the content of a p element n-state LFSR shift register. The sequences generated by p shift register elements in an n-state LFSR in Galois configuration is identical (even if shifted) to a corresponding Fibonacci LFSR with the same number of shift register elements. One can check this by for instance running the Fibonacci LFSR of FIG. 2 with initial content [1 0 1 1] and [h0 h1 h2 h3 h4]=[1 0 0 1 1]. This will generate sequence [0 1 1 1 0 0 0 1 0 0 1 1 0 1] which is a shifted version of the sequence number 4 generated by the Galois generator of FIG. 1 and as illustrated in FIGS. 7 and 8. Accordingly, it does not matter if the ML sequence is generated by a Galois or a Fibonacci configuration LFSRs of p shift register elements. The generated m-sequences will be identical (if shifted) and will have at least $n^p-1$ unique overlapping checkwords with (p-1) symbols in overlap.

If a sequence generated by an LFSR is not an m-sequence, then a checkword will be repeated within the $n^p-1$ checkwords. The LFSR at a content of the shift register that repeats itself will start generating the same consecutive checkwords as a consequence. In accordance with an aspect of the present invention, only the first checkword has to be checked against following checkwords. If the first checkword does not repeat itself within $n^p-2$ consecutive overlapping checkwords of (p-1) symbols overlap, the sequence is a maximum length sequence. However, if a repeat is detected earlier, then the sequence is not an m-sequence and further checking is not required.

The checking process is further illustrated in the following table:

| | | | | | | | | | sequence | | | | | | | | | | |
|---|---|---|---|---|---|---|---|---|---|---|---|---|---|---|---|---|---|---|---|
| word no. | 1 | 1 | 1 | 0 | 1 | 0 | 1 | 1 | 0 | 0 | 1 | 0 | 0 | 0 | 1 | 1 | 1 | 1 | 0 |
| 1 | 1 | 1 | 1 | 0 | | | | | | | | | | | | | | | |
| 2 | | 1 | 1 | 0 | 1 | | | | | | | | | | | | | | |
| 3 | | | 1 | 0 | 1 | 0 | | | | | | | | | | | | | |
| 4 | | | | 0 | 1 | 0 | 1 | | | | | | | | | | | | |
| 5 | | | | | 1 | 0 | 1 | 1 | | | | | | | | | | | |
| 6 | | | | | | 0 | 1 | 1 | 0 | | | | | | | | | | |
| 7 | | | | | | | 1 | 1 | 0 | 0 | | | | | | | | | |
| 8 | | | | | | | | 1 | 0 | 0 | 1 | | | | | | | | |
| 9 | | | | | | | | | 0 | 0 | 1 | 0 | | | | | | | |
| 10 | | | | | | | | | | 0 | 1 | 0 | 0 | | | | | | |
| 11 | | | | | | | | | | | 1 | 0 | 0 | 0 | | | | | |
| 12 | | | | | | | | | | | | 0 | 0 | 0 | 1 | | | | |
| 13 | | | | | | | | | | | | | 0 | 0 | 1 | 1 | | | |
| 14 | | | | | | | | | | | | | | 0 | 1 | 1 | 1 | | |
| 15 | | | | | | | | | | | | | | | 1 | 1 | 1 | 1 | |
| 16 | | | | | | | | | | | | | | | | 1 | 1 | 1 | 0 |

The sequence [1 1 1 0 1 0 1 1 0 0 1 0 0 0 1] is analyzed with 4 symbol checkwords. The first checkword is [1 1 1 0]. The next checkword is created by using the symbols starting at symbol 2 and using the 4 consecutive symbols. The sequence of 15 symbols is extended with the first 3 symbols of the sequence to have a correct test sequence. In pseudo code: seq is the sequence of symbols; seqext is the extended sequence and words are formed from seqext and then tested.

Pseudocode:

```
seqext=[seq seq(1:3)];
firstword=seqext(1:4);
for i = 2:16
    word(i,:) = seqext (i: i+3);
    test =sum(word(i,:) = = firstword);
    "seq is not ML" if test = = 4 AND i < 16
    ELSE "seq is ML"
end
```

Figure 10:
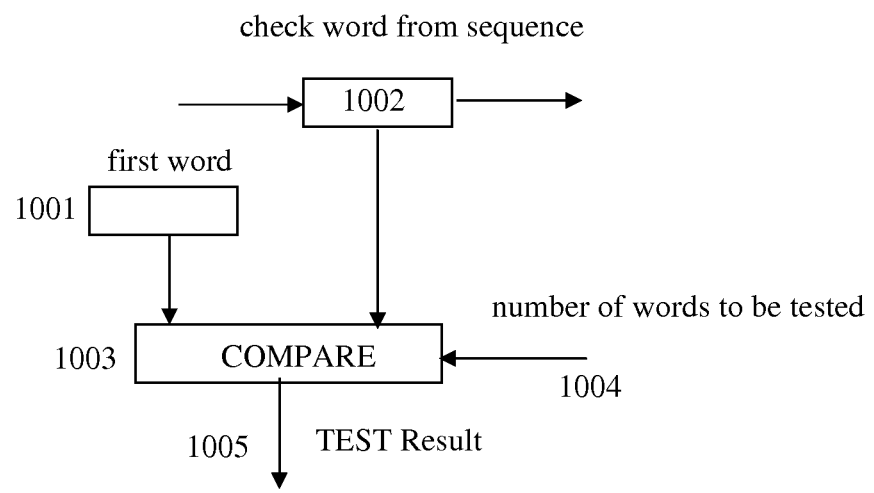
FIG. 10 illustrates steps performed in accordance with various aspects of the present invention.

The testing process is further illustrated in FIG. 10. The first word may be stored in a memory 1001 and the sequence may be shifted through a shift register 1002 with 4 outputs of the individual shift register elements. The content of the memory 1001 is compared in comparator 1003 with the content of 1002 after each shifting period determined by a clock 1004 which also determines how many words have to be tested. This is 14 in this example. The result is outputted on output 1005, which may be high if no identical words have been detected and may turn to low or 0 if an identity of words is detected with the set period of the test. The signal may 0 stop the testing of the specific n-state sequence.

In one embodiment of the present invention one may test the symbols of the actual words against each other. In one embodiment of the present invention one may represent the content of p n-state symbols with a representation, such as a decimal value. The checkword may then be considered a radix-n number with p digits to be represented with a decimal value. In a further embodiment the position of the first repeat is also outputted.

In accordance with a further aspect of the present invention the first checkword is selected to start after the last symbol of the first word. This will reduce the number of required checks. In accordance with an aspect of the present invention the first word and the checkwords are extended with at least two additional consecutive symbols. In accordance with yet a further aspect of the present invention a first checkword is created at least 2 symbols after the last symbol of the checkword.

The correlation method, especially the graphical aspect, is probably more visually pleasing than the novel checking method provided herein in accordance with different aspects of the present invention. However, the novel methods provided herein may be much faster to execute by a processor.

The herein provided methods are also illustrated for a 3 stage 4-state LFSR.

Figure 11:
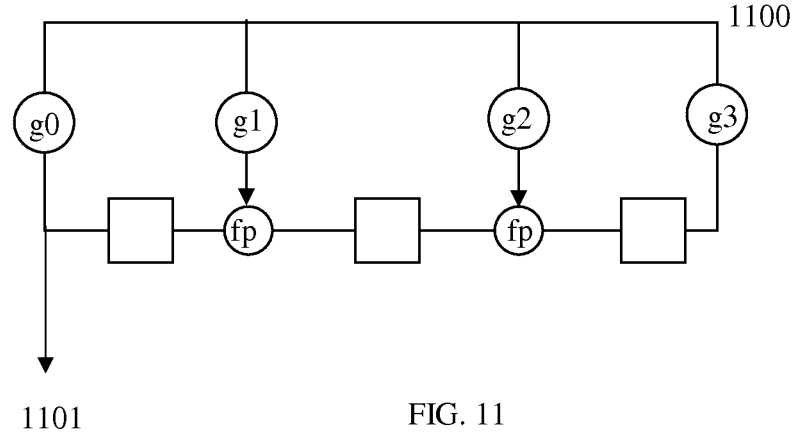
FIG. 11 illustrates an n-state sequence generator in accordance with an aspect of the present invention.

The generic LFSR 1100 for this 4-state example is illustrated in FIG. 11. The sequence of 4-state symbols is generated on output 1100. The function fp herein is a 4-state addition over finite field GF(4) which is defined by the following switching table.

| fp | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

The inverters [g0 g1 g2 g3] in a first approach are multipliers over GF(4) which can be [0 0 0 0], [0 1 2 3], [0 2 3 1] and [0 3 1 2]. For obvious reasons g0 and g3 cannot be inverter [0 0 0 0] and if g0 can assume all inverters except [0 0 0 0] then g3 is always [0 1 2 3]. This means that there are 3*4*4=48 possible sequence generators of which only some will generate a 4-state maximum length sequence of 63 4-state symbols.

Figure 12:
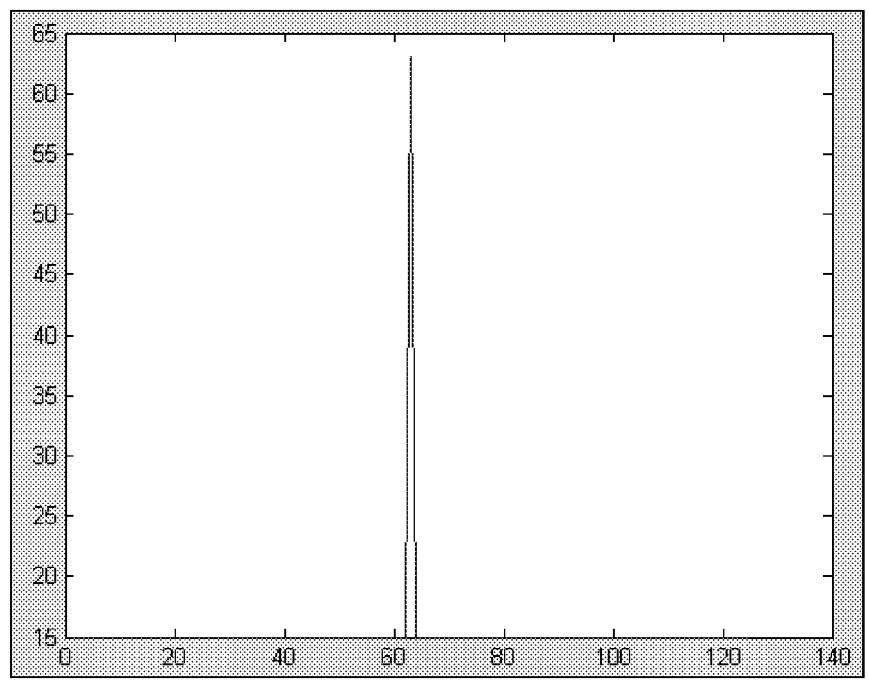
FIGS. 12-13 illustrate correlation graphs of sequences of n-state symbols in accordance with at least an aspect of the present invention.
Figure 13:
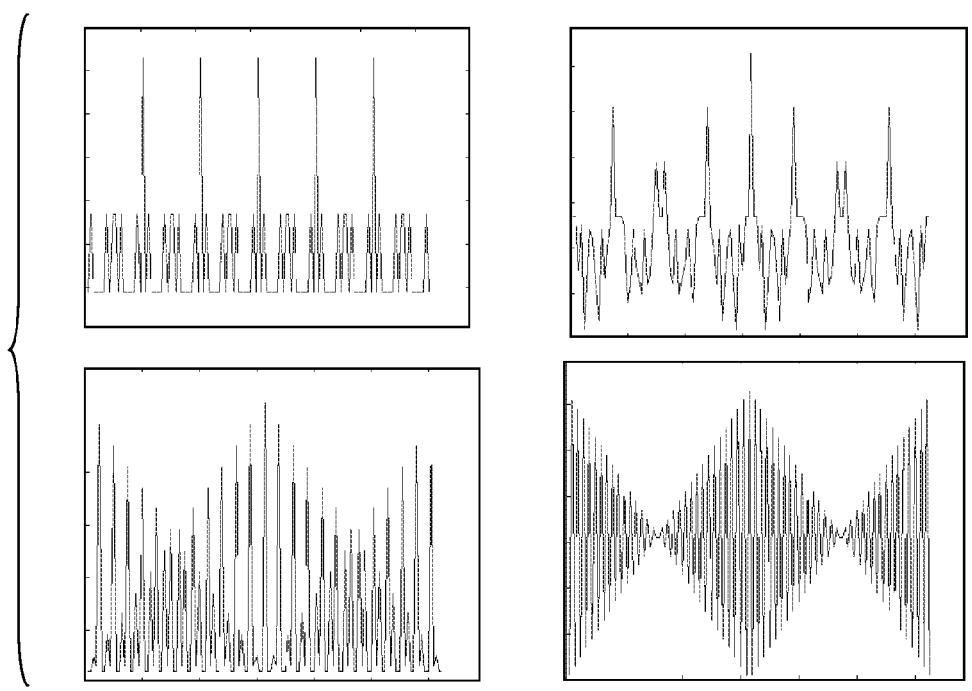

FIG. 12 shows the correlation graph of a 4-state pseudo-noise pn m-sequence of 63 4-state symbols in accordance with the method illustrated in FIG. 4 and explained above. FIG. 13 shows graphs of sequences that are not ML.

In accordance with an aspect of the present invention the generated 4-state sequences are tested by selecting a first checkword and testing it against all other checkwords formed from consecutive 4-state symbols in the sequence. A listing of a Matlab program that conducts this test is shown in FIG. 14.

The array restw(:, 1:2) shows in the first position the number of the configuration, which is an arbitrary number. The second number is an addition of all the positions wherein a repetition of the first checkword occurred. The number 0 means that no repetitions have occurred and the sequence may be considered to be an ML or m-sequence under the assumptions made for the analysis. A listing of restw(:, 1:2) is shown in FIG. 15. One can read from the table that sequences generated by configuration 22, 24, 27, . . . etc are m-sequences. For further application, one can record which configuration (by storing the multiplier data) generates which m-sequence.

It is noted that in the above case one may also analyze the content of the shift register, by making for instance the first shift register content the first checkword and comparing this first check word against all following shift register contents. However, such an approach is only possible if one has access to the sequence generators. One has to analyze the sequence with checkwords if one only has access to the sequence and using the correlation method is not desirable.

The word method was tested against the correlation method in execution time using the TIC/TOC statements in Matlab. The word method is at least 3 times faster in this example. It is noted that the complete sequence was generated and completely tested. If one tests available sequences, the testing can be stopped as soon a repetition has been detected, further speeding up the testing.

In a further embodiment of the present inventions, n-state m-sequences may be generated by using additional inverters. For instance, in the binary case one may include the [0 1]→[1 0] inverter as an additional option in the generator configuration. In that case 4 different m-sequence generators can be realized that generate completely different (and unshifted) m-sequences.

Even more 4-state m-sequence generator configurations can be realized by applying inverters in combination with fp being an addition over GF(4) wherein the inverters are reversible 4-state inverters. There are 24 of such inverters. For the intermediate taps the open connection [0 0 0 0] has to be considered also. Accordingly, there are about 15,000 possible configurations of which 2740 are m-sequence generators. Again, the checkword testing in this case is at least 3 times as fast as the correlation method.

The above case is for a fairly small shift register in 4-state. One can imagine that for sequences generated by generators with n=256 and p>3 the size of the m-sequences becomes very large and fast testing methods such as the checkword method that can be stopped when a repetition is detected may be very advantageous. Furthermore, testing of consecutive shift register contents in testing possible configurations of a sequence generator is also advantageous to replace first generating the complete sequence and then testing the sequence. As soon as a repetition of a shift register content is detected one can stop the generator and start a next configuration, including ones that use one of all possible n-state reversible inverters rather than only multipliers over GF(n).

As to the content of the first checkword. This content can be any possible checkword that occurs as a shift register content or as an occurring word in a sequence. One may even preset the first checkword as a preset value. In that case one should take care that the first checkword is different from the forbidden word dictated by the configuration of the generator, as a forbidden word will never occur in a non-degenerated sequence and the processor in that case may label all tested non-degenerated sequences (incorrectly) as being m-sequences.

In one embodiment of the present invention the first checkword of a sequence is formed from at least the first p n-state symbols in an n-state sequence of n-state symbols, with n=2 or n>2. In one embodiment of the present invention the first checkword of a sequence is formed from at least p consecutive n-state symbols selected in an n-state sequence of n-state symbols, with n=2 or n>2. In one embodiment of the present invention the first checkword is compared with at least p consecutive n-state symbols not being the p consecutive symbols selected to form the first checkword.

It is suggested by the tables and program listings that the testing of the checkwords has to take place from the beginning of the sequence to the end. The beginning of a sequence being the part that is either received first by a processor, that is generated first or that is read first from a memory. This is not strictly required. One can start from a beginning of a sequence or from an ending. In case of testing from the end to the beginning the tested sequence has to be extended at the beginning with the last (p−1) symbols. If one selects the first p consecutive symbols as the first checkword and starts testing moving towards the end or with the last p consecutive symbols as the first checkword moving towards the beginning there are $n^p-2$ n-state checkwords of p symbols overlapping in (p−1) n-state symbols left to be tested as there are $n^p-1$ overlapping checkwords in an extended n-state m-sequence wherein the m-sequence has $n^p-1$ n-state symbols, because the first word is the first checkword and does not require checking.

In one embodiment of the present invention an initial first checkword is selected, which is not the first checkword in the sequence or the extended sequence. In that case one has to check for a detection of the first checkword for a second time, to determine that a sequence is not an m-sequence.

In one embodiment of the present invention one has a multi-processor or a multi-core processor wherein each processor or core applies a different first checkword. In that case the first checkwords may be selected at random, because even if a forbidden word is selected the other word is certainly a checkword that occurs in the extended sequence.

Further analysis of n-state sequence generators with p n-state shift register elements and additions and multipliers over $GF(n=p^2)$ shows that if a repeat of a checkword of p n-state symbols as defined above occurs within the extended sequence of $n^p-1+p-1$ symbols (which means that the sequence is not maximum length) it will appear within the first ½ of the extended sequence or it will not occur at all within the extended sequence. This means that the testing of the sequence in one embodiment of the present invention can be limited to checkwords which start with its first symbol within at most half of the sequence. Depending on the search direction, this can be the first half or the second half. If the sequence is not ML then a repeat will be found within the half of the sequence. If no repeat is found within the first half of the sequence then no repeat will be found in the second half and further search will be useless.

Figure 16:
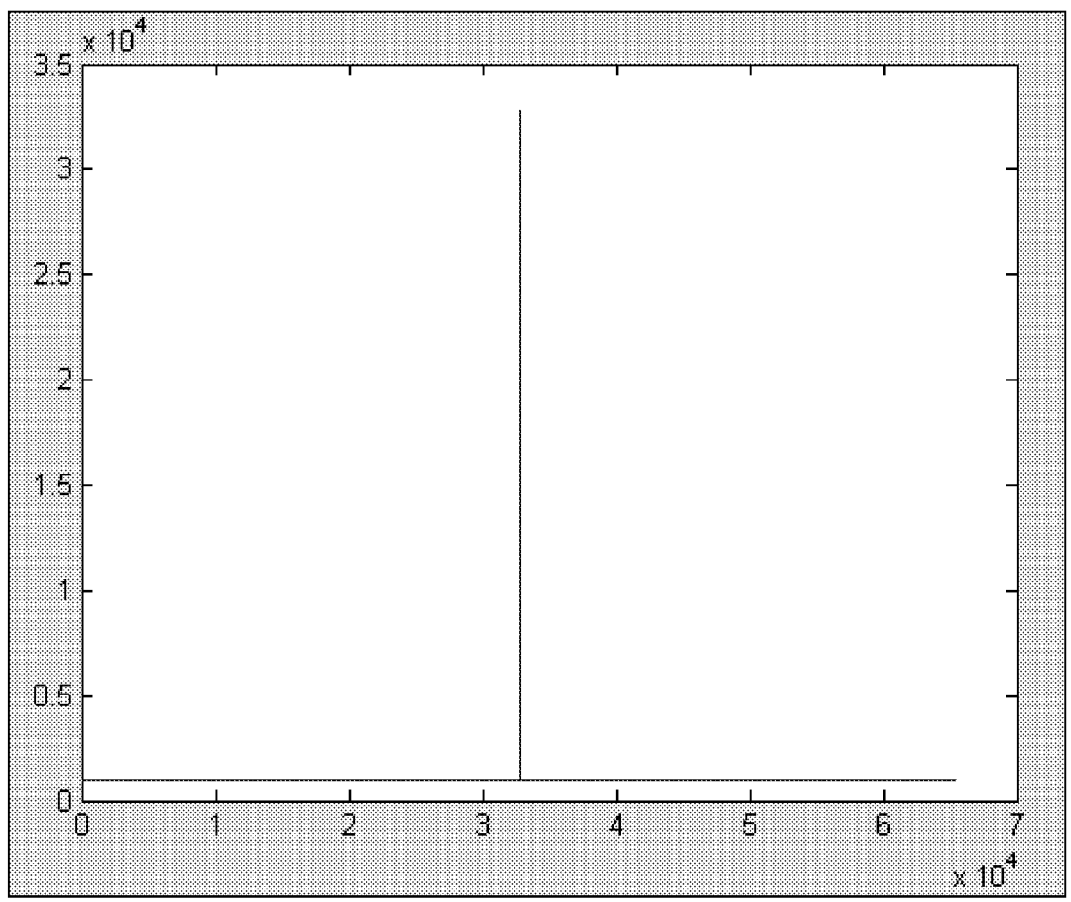
FIGS. 16-17 illustrate correlation graphs of sequences of n-state symbols in accordance with at least an aspect of the present invention.

FIG. 16 shows the correlation graph of a 32767 m-sequence of 32-state symbols generated by a sequence generator of type as shown in FIG. 11 with a 32-state LFSR with 3 32-state elements and fp and with inverters/multipliers [g0 g1 g2 g3] defined as adders and multipliers over GF(32) respectively, wherein [g0 g1 g2 g3]=[2 5 0 1] in this example or g0=2, g1=5, g2=0 and g3 is multiplier 1 or in other terms g3 is the identity inverter which leaves any state unchanged. The graph is a single flat line with a single peak, as was explained above.

It is possible to provide n-state sequence generators such as the one of FIG. 11 with inverters [g0 g1 g2 g3 . . . ] that are reversible n-state inverters that are strictly multipliers over GF(n). In that case the above rule of checking a half or less of the sequence for checkword repetitions can be applied. In the 32-state case the GF(32) based sequences for a 3 element shift register which will generate a sequence $32^3-1=32767$ of 32-state symbols. No repetitions occur at a position greater than position 5000 in the sequence.

However, if one uses other 32-state reversible inverters than multipliers over GF(32) the situation is entirely different. The configuration of FIG. 11 with fp being an addition over GF(32) and g0 is multiplier 3 over GF(32): [0 3 4 5 6 7 8 9 10 11 12 13 14 15 16 17 18 19 20 21 22 23 24 25 26 27 28 29 30 31 1 2]; g1 is multiplier 5 over GF(32): [0 5 6 7 8 9 10 11 12 13 14 15 16 17 18 19 20 21 22 23 24 25 26 27 28 29 30 31 1 2 3 4]. However g2 is in this example a 32-state reversible inverter: [30 5 6 7 8 9 10 11 12 13 14 15 16 17 18 19 20 21 22 23 24 25 26 27 28 29 0 31 1 2 3 4]. This g2 is clearly not a multiplier over GF(32), which one can see because state 0 is not reversed into state 0 (which is a hallmark characteristic of multiplication over GF(n).) The multiplier g3=1 is the identity inverter.

Figure 17:
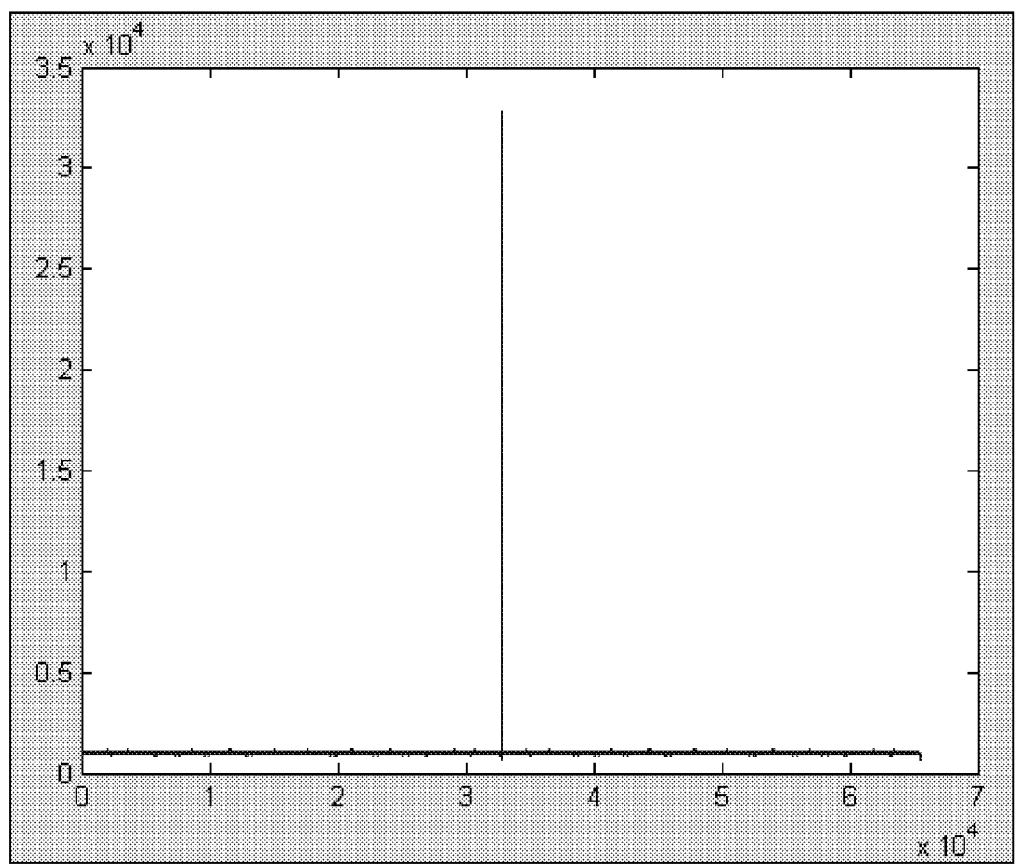

Testing with checkwords shows that the repetition of the first checkword formed by the first 3 symbols of this 32-state sequence appears at symbol 32697 of 32767 symbols, almost at the end of the sequence. This means that the sequence of up to symbol 32696 is in fact pseudo-random of maximum length 32696 in accordance with a definition of n-state maximum length as having non-repeating checkwords. FIG. 17 provides a correlation graph of this sequence. It shows a single large peak. However the other part of the graph is a noisy line rather than the flat straight line of FIG. 16. This illustrates very good pseudo-noise properties, but not the perfect m-sequence properties of FIG. 16.

FIG. 18 illustrates different 32-state sequences of 32767 32-state symbols generated by the configuration generator of FIG. 11, wherein at least one 32-state inverter is not a multiplier over GF(32).

FIG. 19 illustrates in a table a set of 32-state sequences generated by the configuration of FIG. 11 with the shown multipliers in the table and tested against a first repetition of a first checkword. In one embodiment of the present invention a checkword is an actual word of n-state symbols and a check takes place against another word of n-state symbols. In one embodiment of the present invention a checkword is converted into a single number, for instance from a radix-n number into a decimal number. The symbols in a word then represent coefficients in a radix-n word which can be converted into a single decimal number for instance.

The table of FIG. 19 illustrates that in one configuration no repetition occurs, (number 29 first repetition is 0 which means no repetition) and thus an n-sequence may be assumed.

As discussed earlier, one can create n-state (such as 32-state) sequence generators by using some or all of the inverters not being multipliers over GF(n). This can create some very interesting sequence generators, for instance one of which a correlation graph is illustrated in FIG. 17. One property of these $n^p-1$ length sequences is that they contain a maximum-length sequence with a number of n-state symbols $0.5*(n^p-1) \le k \le n^p-1$ with non-repeating checkwords of p n-state symbols. The sequence generators to generate these type of sequences may contain at least one n-state inverter not being a multiplier over GF(n).

These sequences may have one unexpected property, which is that it may contain a first checkword of p n-state symbols which is not repeated in the sequence. Some of these sequences remain non-repetitive for a considerable number of symbols, until they reach a stage wherein a checkword becomes an initial repetitive checkword. To address this issue, one may check an extended n-state sequence from a beginning to end and for end to beginning.

Figure 20:
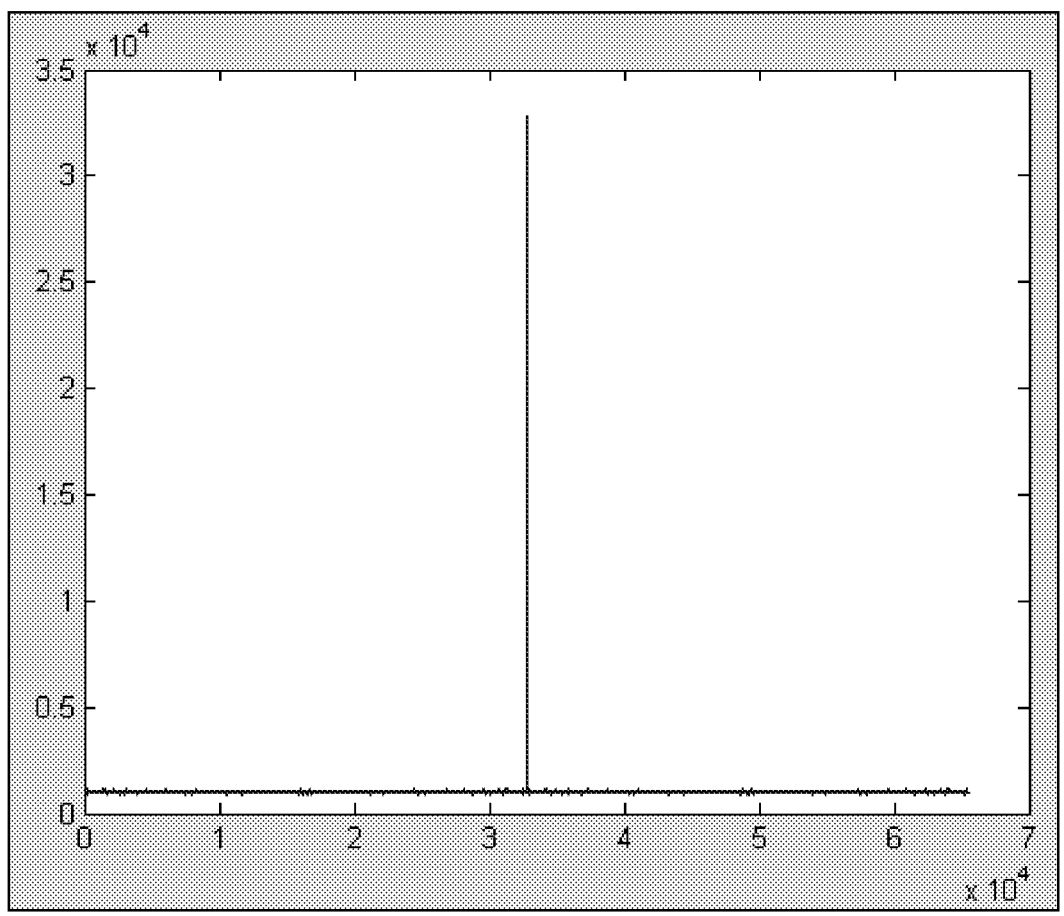
FIG. 20 illustrates a correlation graph of a sequence of n-state symbols in accordance with at least an aspect of the present invention.

A correlation graph of such a sequence is provided in FIG. 20. The related sequence generator applies the configuration of FIG. 11 with g0 and g1 being [0 5 6 7 8 9 10 11 12 13 14 15 16 17 18 19 20 21 22 23 24 25 26 27 28 29 30 31 1 2 3 4] and g3 being [22 28 29 30 31 1 2 3 4 5 6 7 8 9 10 11 12 13 14 15 16 17 18 19 20 21 0 23 24 25 26 27].

Program script of a Matlab program that generates the sequence and sets initial parameters is shown in FIG. 21. The listing provided in FIG. 22, is part of the same program and performs the forward and reverse testing of checkwords. Part of the result is illustrated in the tables of FIG. 23 for forward and backward checking. The sequence generated by the generator configuration number 29 (which is the above generator) shows no repletion is forward or backward direction. However, the related correlation graph of FIG. 17 indicates a not ideal m-sequence.

In accordance with an aspect of the present invention a complete check on maximum-length is also provided. This method checks all occurring checkwords and assigns its occurrence to a memory address or array address, preferably related to its radix-n value. The memory has $n^p$ consecutive addresses. In one embodiment of the present invention initially a content of the memory related to each address is 0. Each checkword of p n-state symbols and overlapping by p−1 symbols with a consecutive word in the sequence is interpreted as a radix-n number and is translated into a decimal number. The decimal number is treated as the address and the content of the address is made 1. This is illustrated in FIG. 24. Even if the content was already 1, then it is still replaced by one, in case of repetition. All checkwords in the sequence are processed and the content of all memory elements or array elements are summed.

It should be clear that in case of a true LFSR generated n-state m-sequence all $n^p-1$ words of p n-state symbols should occur exactly once. Thus the number of addresses in an m-sequence that have content 1 (or sum(base(wordv+1))) or len*1 is identical to the length (len) of the sequence. It is noted that the "+1" in (wordv+1) is applied because Matlab indices work from origin 1. One may subtract $n^p-1$ from the sum, which should generate 0 in case of a true n-state LFSR m-sequence In one embodiment of the present invention, one starts with an array or memory of $n^p$ consecutive addresses with content 1. Each word of p n-state symbols in the sequence (overlapping in p−1 symbols with a consecutive word in the sequence) is converted into a memory address (in Matlab as a decimal number) and the content of that address is made 0. Even if the content was already 0 the program in for instance Matlab still updates it. All checkwords in the sequence are processed and the content of all memory elements or array elements are summed. From that sum a 1 is subtracted (as there are $n^p$ possible checkwords words but an LFSR true m-sequence has $n^p-1$ n-state symbols). When the result is 0 the sequence is a true n-state LFSR maximum-length sequence.

The example sequence of FIG. 23 will generate a number 2, which means that the sequence of generator 29 in FIG. 23 has 2 repetitions in checkwords.

Other embodiments to administer repetitions of checkwords in sequences are possible and are fully contemplated. For instance one can store the number of duplications. One can also include a second (much smaller) array that stores the address offset between repetitions, etc, etc.

One can apply the above approach also for LFSR shift register contents during generation of the sequences. One can stop the generation and discard the configurations as soon as a repetition has been detected. The approach is very useful and very fast in analyzing sequences of which one does not know a priori the characteristics.

One may receive a sequence of n-state symbols without knowing any of its characteristics, except the number of symbols and the possible states. At that stage it is important to determine the number of n-state symbols in a checkword. Assume that the sequence is a true n-state LFSR m-sequence. In that case it has $k=n^p-1$ n-state symbols. One then should calculate p=ln(k+1)/ln(n). If one suspects that the sequence could be an m-sequence one should calculate an approximation of p as {ln(k)/ln(n)).

The approaches and methods provided herein in accordance with various aspects of the present invention can be applied in different situations and applications. It can be applied during generation of a sequence when access is available to shift register content. In that case one can check the content of the LFSR register against duplication as each new symbol generated in a sequence is associated with the content of the LFSR, be it in Galois or Fibonacci configuration. Clearly the herein provided methods are much faster than determining a complete correlation. Furthermore, sequence generation can be stopped when repetition occurs of shift register content.

The methods can also be applied when a sequence is received or made available from a memory or a storage device and a processor has to decide if the sequence is maximum length. The checkword method is a fast method that also can be halted when a repetition of a checkword occurs. Several approaches for checkword checking and evaluation have been provided herein.

FIG. 25 illustrates in program script a method to determine the maximum length property of a 32-state sequence. This method applies the content of the shift register of a configuration of the generator to determine the maximum-length property of the generated sequence, without testing the actual sequence, though one can do that also by applying the earlier provided methods. If no content of the shift register, be it in Galois or Fibonacci configuration, repeats itself in a sequence of k generation steps of the generator then the generated sequence is of length k. Preferably, one wants to find a sequence of maximum length $n^p-1$, or even $n^p$, wherein in $n^p-1$ or $n^p$ steps the shift register content does not repeat itself. It should be noted that in this method the actual sequence need not to be generated or stored. As a special feature in this example inverters are used that are not multipliers over GF(n).

Figure 26:
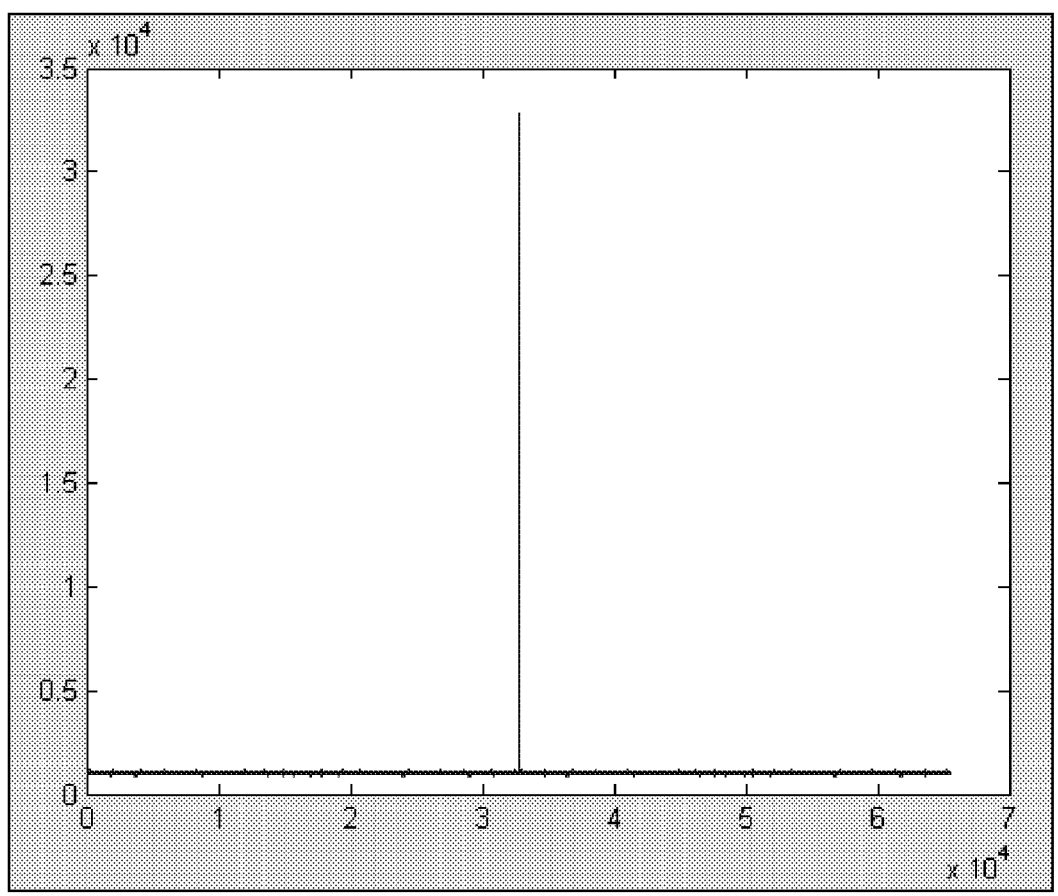
FIGS. 26-27 illustrate correlation graphs of sequences of n-state symbols in accordance with at least an aspect of the present invention.

The program script of FIG. 25 applies the inverter m2=m321(i2,:) with i2=1 which is the inverter m2=[0 6 7 8 9 10 11 12 13 14 15 16 17 18 19 20 21 22 23 24 25 26 27 28 29 30 0 1 2 3 4 5]. The configuration of FIG. 25 generates a maximum length 32-state sequence of 32767 32-state symbols. However, the correlation graph is not entirely flat as is illustrated in the graph of FIG. 26. It is also noted that the inverter m2 is not reversible as the state 0 appears twice. Accordingly, a maximum length sequence of $n^p-1$ symbols can be generated by a generator using at least one n-state inverter not being a reversible inverter.

One can check the 8-state case for the configuration of FIG. 11 wherein the multipliers g0 and g1 over GF(8) are g0=2 and g1=1, g3=1 and g2=[2 1 7 3 5 4 0 6]. The inverter g2 is a reversible 8-state inverter. The generator will generate a maximum length 8-state sequence of 511 8-state symbols and have a flat correlation graph with a single peak. One can determine the generator by checking the configuration on repeats on shift register content within 511 generation steps. It is not required for this test to use the actual sequence.

It should be clear that checking all possible 32-state configurations for all possible 32-state inverters would be quite a formidable task in numbers as there are $32^{32}$ possible 32-state inverters. It is much easier to check at least one series of 4-state configurations of the FIG. 11 configuration for using at least one set of all possible 256 4-state inverters. For illustrative purposes the configuration of FIG. 11 is used wherein the 2-input/single output function fp is an addition over GF(4), the multipliers g0 and g1 are multipliers over GF(4) while for g2 all 256 possible 4-state inverters are applied. In that case one can find at least 216 different configurations that will generate maximum length 4-state sequences of 63 4-state symbols. Because there are only 48 (3*4*4) configurations with multipliers over GF(4) in this situation, it should be clear that many more maximum length sequences thus can be generated.

Figure 27:
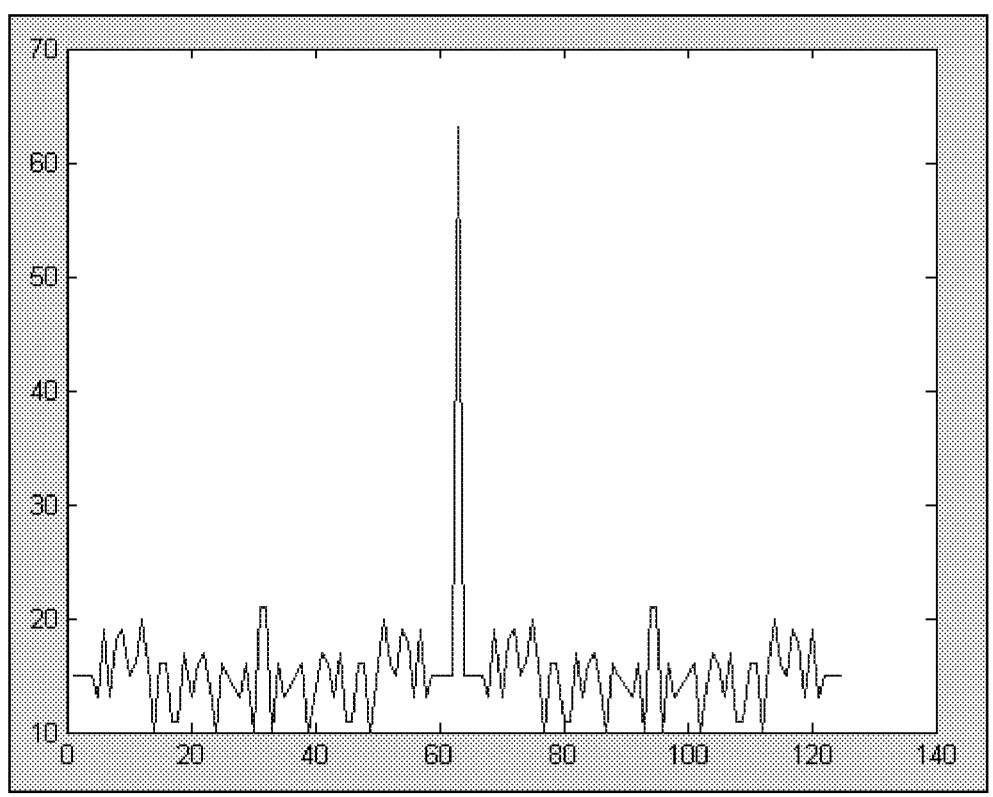

One such configuration applies the multipliers g0=4 and g1=3 and g2=[3 3 2 1], which is non-reversible. The corresponding correlation graph of the sequence generated by that configuration is provided in FIG. 27. It is noted that configurations with reversible 4-state inverters may generate a flat correlation graph with a single peak.

Accordingly, one can systematically generate maximum-length n-state sequences of length $n^p-1$ n-state symbols by LFSRs in Galois or Fibonacci configuration with a register of p elements and by using at least one non-reversible n-state inverter which will not generate a flat correlation graph with a single peak. One can also apply n-state functions other than fp being an addition over GF(n). For instance one can use a modulo-n addition. In one example fp being a modulo-4 addition is used with g0=2, g0=0 as multipliers over GF(4) and g2=[1 1 3 3] to generate a maximum length sequence with a flat correlation graph with a single peak. It is noted that in general configurations of generators with the modulo-4 addition with only multipliers over GF(n) with n being a power of 2 do not generate a flat graph maximum length sequence.

Figure 28:
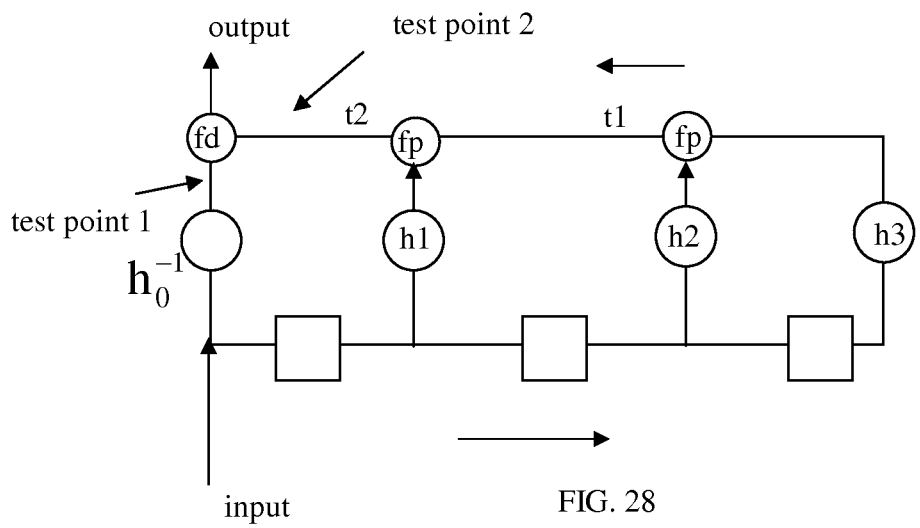
FIGS. 28-29 illustrate sequence detectors in accordance with at least an aspect of the present invention.
Figure 29:
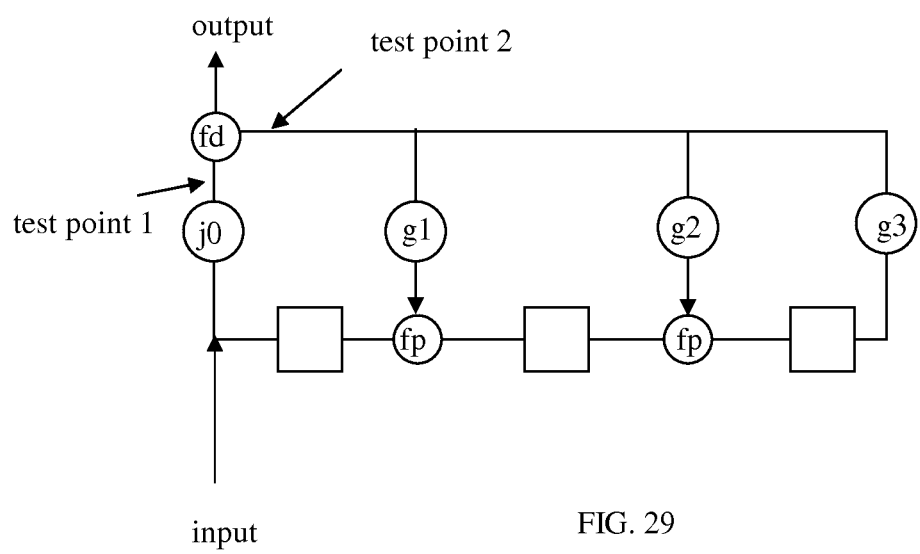

There is another way to determine a sequence generator that corresponds to an n-state sequence that is received or retrieved from a memory. One can construct a descrambler as illustrated in FIG. 28 with a function fd as descrambling function. The descrambler is self synchronizing as it flushes the state of the register which is connected in forward direction. This means that it really does not affect detection if one applies an arbitrary initial state of the shift register. Sequence generators in Galois configuration having corresponding generators in Fibonacci configuration and vice versa. Furthermore, an LFSR based sequence generator has a corresponding detector, with a detecting function fd. As shown in FIGS. 28 and 29 a detector will generate a sequence at test point 2 that is identical to the sequence at test point 1. For the configuration of FIG. 29 it is required that the correct initial shift register content is applied. Such a condition is not required for the configuration of FIG. 28 which flushes the register in this example in three clock pulses. This then requires that the function fd can detect identical symbols at its inputs. One simple detection function fd is illustrated in the following truth table in the 4-state example.

| fd | 0 | 1 | 2 | 3 |
|----|---|---|---|---|
| 0  | 0 | 1 | 1 | 1 |
| 1  | 1 | 0 | 1 | 1 |
| 2  | 1 | 1 | 0 | 1 |
| 3  | 1 | 1 | 1 | 0 |

This function generates a state 0 when both inputs are identical and a state not 0 when the inputs have different states. By ignoring the first three symbols of the sequence (or initial condition of the decoder) in FIG. 28 one will generate after the first 3 symbols a sequence of all 0 symbols. It is noted that the addition over GF(4) also meets the requirements for the function fd. It is further noted that the inverter $h_o^{-1}$ in the descrambler is the inverse of inverter h0 in the generator.

A Matlab program that runs through all possible configurations for descrambling (in this example only using multipliers over GF(4)) is shown in FIG. 30. It ignores the first 3 symbols in the generated sequence 'res' and then adds all the symbol values from symbol 4 to 64. If all symbols are 0 then the sum is zero and the detector corresponds to a generator. The result is illustrated in FIG. 31. The result indicates that a Fibonacci generator with multipliers 1, 2 and 0 would generate this sequence. It is noted that multipliers h0 and p0 are the reverse of the required multipliers. It is also noted that the detectors do not determine if the sequence is maximum length. Once the correct descrambler of FIG. 28 is identified that belongs to a certain n-state sequence, one can determine the correct initial state for the sequence generator that generates this sequence. There are several way to determine the correct state. The following explains at least one way.

Assume that the descrambler of FIG. 28 started with the wrong initial state. However, after three cycles the correct state is in the shift register, as [a b c] has been flushed. Assume that the sequence is [p1 p2 p3 p4 p5 p6 p7 . . . ]. So, if the content of the shift register is [p3 p2 p1] then p4 is provided on the input and 0 is provided on the output as there are no more errors. One cycle before that, the output is presumably not 0, and the content is [p2 p1 c]. If c had the correct state, then the output would generate 0. With h3=1, one then has the following expressions: t1=(h2*p1) fp c; t2=(h1*p2) fp t1; and $h_o^{-1}$*p3=t2. Or $h_o^{-1}$*p3=(h1*p2) fp {(h2*p1) fp c}. Keeping in mind that fp is the self-reversing addition over GF(n) which can be represented by +, one can determine that c=h1p2+h2p1+$h_o^{-1}$p3. By working the way back one can thus also determine 'b' and 'c'.

The configuration of FIG. 29 works also, but requires an appropriate initial setting of the shift register to work correctly.

In accordance with an aspect of the present invention, a catalog of n-state sequences and of related n-state sequence generators can be generated. The catalog provides the state of n-state (such as n=8 or n=32); the length of the shift register p, the configuration of the sequence generator (Galois or Fibonacci and multipliers or inverters in the taps); the 2-input/single output n-state function(s) that are applied; an initial state of the shift register, the length of the sequence, $n^p-1$ for instance; the maximum-length characteristic of the sequence (yes/no); if not m-sequence where the first repeat occurs; the forbidden word of the sequence generator (the word or content of the shift register that does not occur in an m-sequence; the nature (flat or non-flat with peak) of the correlation graph; a corresponding descrambler; if inverters not being multipliers over GF(n) are used; and a copy of the sequence if that is so desired. Availability of such a catalog, allows one to select a sequence for a particular application without having to generate or test the sequences. The catalog can be a catalog for n-state sequences with n=2 and for n-state sequence and sequence generators with n>2 and for n-state sequence and sequence generators with n>3 and for n-state sequence and sequence generators with n>7.

In one embodiment of the present invention the catalog of n-state sequences is created from n-state sequences of which the sequence generator is unknown. For instance, from a memory or from a device with unknown sequence generating properties, a plurality of sequences is received. The herein provided methods allow to characterizing the sequences by their maximum-length properties. If one can store the whole sequence or a significant part of the sequence, for instance at least 10% of the symbols or at least up to 1000 n-state symbols, or up to at least 10,000 n-state symbols, or up to at least 100,000 n-state symbols, one can also determine an n-state sequence generator that generates a sequence that contains at least the stored part of the n-state sequence.

The herein provided methods in accordance with various aspects of the present invention, also allows a processor to characterize the maximum-length properties or the repetition properties of n-state sequences that are generated by n-state sequence generators that have n-state switching functions and/or n-state inverters that are not defined by the known additions and multipliers over a finite field GF(n). As illustrated above, one can test all 8-state sequence generators of 3 shift register element 8-state LFSRs using any of 8-state reversible inverters, which include 8-state inverters that are not multipliers over $GF(8=2^3)$. Furthermore, as illustrated earlier in the 32-state case, one can include at least one n-state inverter that is not a reversible inverter. Such n-state sequence generators (and their related sequences) form a new class of devices which was previously unknown or was previously not provided in a systematic catalog.

In accordance with an aspect of the present invention, one can provide a unique numbering system to a set of n-state inverters, each number referring to a specific n-state inverter. For instance, in the 4-state case there are $4*4*4*4=256$ different 4-state inverters of which $2*3*4$ or 12 are reversible. For instance one can generate 4-state sequences with the configuration of FIG. 11 wherein fp is an addition over GF(4) and the inverters are any of the 256 different 4-state inverters. One can then generate a catalog of 4-state m-sequence generators of sequences of 63 4-state symbols as illustrated in FIG. 32. The table shows a column called 'flat' which indicates ('1') if the correlation graph is flat with a single peak or not ('0'). Columns marked as 'mul', inv2 and inv3 refer to a number of an inverter. The column 'mul' refers to the table of FIG. 33 with multipliers over GF(4). The columns inv2 and inv3 refer to a table of all 4-state inverters of which part is shown in FIG. 34. One can see that this table also contains non-reversible 4-state inverters. The function fp used herein is an addition over GF(4). One may also use the modulo-4 addition as function fp.

Generation of tables with all n-state inverters or all reversible n-state inverters in one embodiment of the present invention is achieved by applying Matlab script. For instance in the 4-state case there are $4*4*4*4$ 4-state inverters. These are placed in a 256 rows 4 columns array 'inv4' which is generated in Matlab as follows:

inv4=zeros(256,4)
tel=0;
for i1=1:4
for i2=1:4
for i3=1:4
for i4=1:4
tel=tel+1;
inv4(tel,:)=[i1 i2 i3 i4];
end
end
end
end Matlab works origin 1. In one embodiment of the present invention an inverter is formed by subtracting 1 from a row in inv4.

A set of 4-state reversible inverters is formed from the permutations of vector [0 1 2 3] or [1 2 3 4] in Matlab. For instance by taking invg=[4 3 2 1] the Matlab statement inv4r=perms(invg) will generate 24 4-state reversible inverters in array inv4r.

Figures 35, 36:
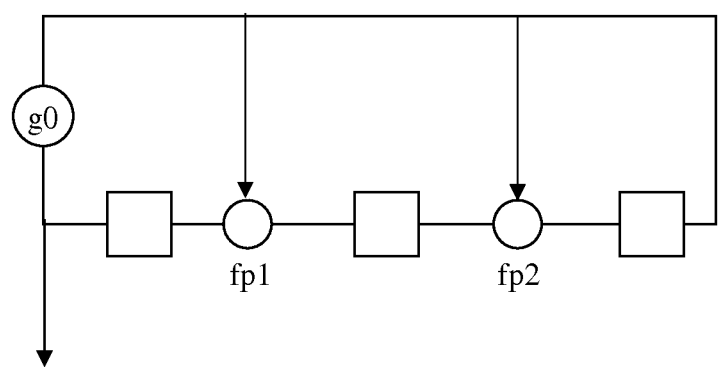
FIG. 35 illustrates results of testing sequences of n-state symbols in accordance with various aspects of the present invention.
FIG. 36 illustrates an LFSR configuration in accordance with an aspect of the present invention.

The use of the addition modulo-4 will also create 4-state m-sequences with and without a correlation graph being flat and a single peak. This is illustrated in the table of FIG. 35 which lists a series of sequence generators applying the mod-4 addition and the multiplier m3 of FIG. 33 (which is the multiplier 2 over GF(4)) and 4-state inverter numbered 41 (which is [0 2 2 0]) as inv2 and 4-state inverters numbered 96 etc for inv3. One can find the 4-state inverter from the number by subtracting 1 from the number (from 41 that is 40 and generate the radix(4) coefficients, which is [0 2 2 0]). The 4-state inverter 96 is thus the radix-4 representation of 95, which is [1 1 3 3].

One can check with the methods provided herein that an n-state pseudo-noise or maximum length sequences with n an integer greater than 1, with n an integer greater than 2, with n and integer greater can be generated in accordance with one or more aspects of the present invention with a linear feedback shift register (LFSR) or LFSR based program implemented on a processor by using or implementing at least one n-state inverter which is not a reversible n-state inverter or by using or implementing a 2-input/single output n-state logic or switching function which is a non-reversible n-state logic or switching function.

The addition modulo-4 cannot be created from the addition over GF(4) using 4-state inverters. One may also use other 4-state functions fp.

The same approach as provided above can be applied to determine any other n-state m-sequence $n=2^p$ or n is a prime number such as n=3, etc. In case of n being prime then the modulo-n addition is also an addition over GF(n). Other n-state functions can also been used to generate n-state m-sequences.

In accordance with an aspect of the present invention the function fp, either in the Galois configuration n-state LFSR, or in the Fibonacci n-state LFSR is reduced by the inverters it is connected to. This is illustrated in FIG. 36 which is a reduced version of FIG. 11. The two functions fp, one with inverter g1 at an input and one function with inverter g2 at an input in FIG. 11 and with g3=1 is reduced to the LFSR as shown in FIG. 35 with reduced functions fp1 and fp2 and with the same output 1101 which will generate the same sequence as in FIG. 11. For instance the addition over GF(4) modified by the 4-state inverter [0 3 0 3] at the input determining a column of the related truth table will reduce to the following non-commutative table fp2.

| fp2 | 0 | 1 | 2 | 3 |
|---|---|---|---|---|
| 0 | 0 | 3 | 0 | 3 |
| 1 | 1 | 2 | 1 | 2 |
| 2 | 2 | 1 | 2 | 1 |
| 3 | 3 | 0 | 3 | 0 |

An advantage of such a reduction is that the number of steps that have to be executed is reduced. Instead of an inversion and a function only a function has to be executed.

There are more functions than combinations of n-state inverters at inputs and output of a function. Certain functions (such as the 4-state addition over GF(4)) cannot be formed by applying single inverters at inputs and output of the modulo-4 addition. The sequence generators applying these non mutual expressable n-state functions are thus different from each other. In accordance with an aspect of the present invention a catalog of n-state sequence generators is provided, including one or more of the following properties:

the state in n-state (2, or greater than 2, $2^p$, or any other integer state n>1);
the number of n-state shift register elements;
the configuration (Galois or Fibonacci) of the generator;
the initial state of the shift register;
the applied n-state 2-input/single output functions;
the applied n-state inverters;
an indication if the sequence has $n^p-1$ unique checkwords;
an indication if the LFSR content is unique for $n^p-1$ cycles;
an indication if the correlation graph of a generated sequence is flat with a single peak;
a location of a first duplication of a checkword (either as content of the LFSR or as checkword in the sequence).

The above methods have been applied in generation and testing of 3-state and 5-state sequences wherein the modulo-n addition is the addition over GF(n). As expected, all methods work well in these and other cases.

The above methods can be implemented as circuitry in binary logic. It can also be implemented as n-state circuitry. It can also be implemented as instructions to perform the steps of the methods on a processor containing memory to store data including instructions and enabled to execute instructions that perform the steps of the methods as provided herein in accordance with one or more steps of the present invention. The circuitry may also be implemented with integrated circuitry or customized circuitry in Field Programmable Gate Arrays, provided with D/A and A/D conversion circuitry when required. In one embodiment one can implement the circuitry on a processor such as a programmable microprocessor. A memory is provided with any processor in one embodiment of the present invention to store data and instructions allowing the processor to apply the stored instructions which perform the steps of the methods of the present invention.

The term symbol is used herein. An n-state symbol is a representation of an n-state which can assume one of n-states, usually one of 2 states in the binary case or one of more than 2 states in the non-binary case. A state is represented by a signal. A signal may be a voltage, a current, a charge an optical phenomenon, a magnetic phenomenon, an electromagnetic phenomenon, a mechanical phenomenon, a quantum-mechanical phenomenon, a biologic phenomenon, the absence or presence of a material or a signal, or any other physical phenomenon that can represent a state. A state may be represented by a single signal, it may also be represented by a plurality of signals. For instance an n-state symbol may be represented and processed as a plurality of bits.

An n-state symbol represented by a signal is explicitly intended to be processed by a machine or a device that processes at least one input signal into an output signal, preferably in accordance with an n-state truth table that defines an output state of a device in accordance with one or more input states. Symbols are processed and generated and/or outputted by a device with a speed that is beyond the capacity of a human being. That speed in one embodiment of the present invention is at least 100 n-state symbols per second, in a more preferable embodiment at least 1000 n-state symbols per second and in a most preferable embodiment at least 1,000,000 n-state symbols per second with n=2 or n>2. Currently available processors and circuitry can achieve processing speeds on a clock of well over 1 GHz. Accordingly, the preferred speeds are well within the reach of current technology.

The methods and apparatus of the present invention are useful in many applications. In one embodiment of the present invention, a method or apparatus as provided herein in accordance with an aspect of the present invention is applied in a processor. In one embodiment of the present invention, a method or apparatus as provided herein in accordance with an aspect of the present invention is applied testing of LFSR configurations to generate n-state m-sequences. In one embodiment of the present invention, methods or apparatus as provided herein in accordance with an aspect of the present invention are applied in a computing device. In one embodiment of the present invention, a method or apparatus as provided herein in accordance with an aspect of the present invention are applied to test a maximum length characteristic of sequence of n-state symbols. In one embodiment of the present invention, a method or apparatus as provided herein in accordance with an aspect of the present invention is applied for designing or testing communication device. In one embodiment of the present invention, a method or apparatus as provided herein in accordance with an aspect of the present invention is applied in designing or testing communication device storage device. In one embodiment of the present invention, a method or apparatus as provided herein in accordance with an aspect of the present invention is applied in a communication device. In one embodiment of the present invention, a method or apparatus as provided herein in accordance with an aspect of the present invention is applied in a mobile computing device.

Figure 37:
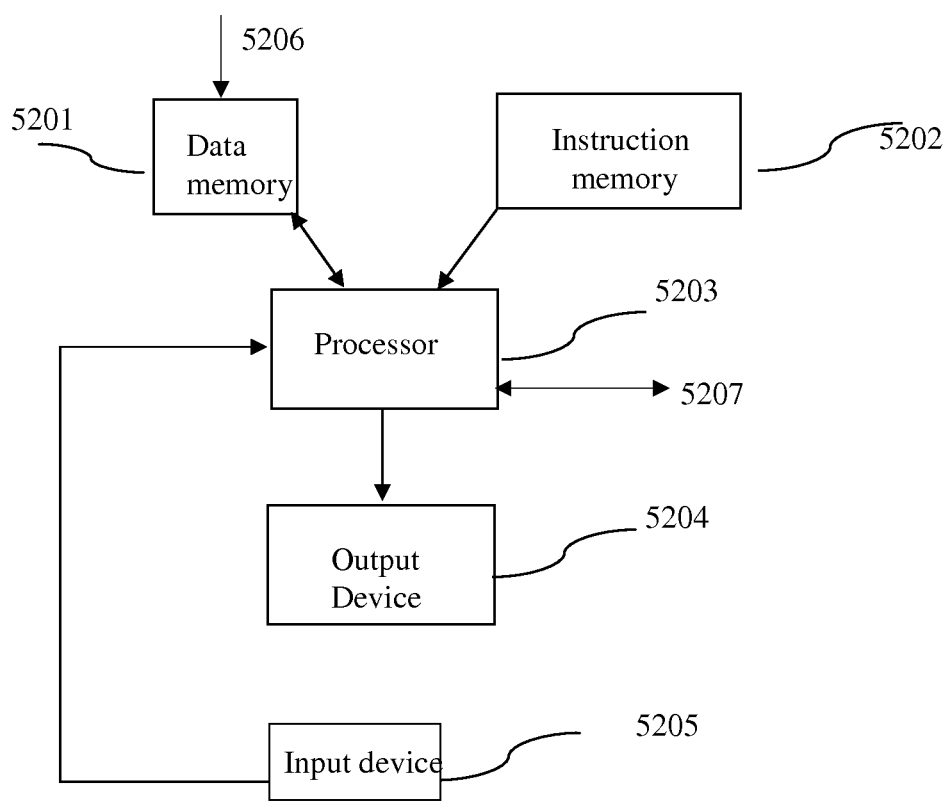
FIG. 37 illustrates a processor based system in accordance with at least an aspect of the present invention.

The methods as provided herein are in one embodiment of the present invention implemented on a system or a computer device. A system illustrated in FIG. 37 and as provided herein is enabled for receiving, processing and generating data. The system is provided with data that can be stored on a memory 5201. Data may be obtained from a receiver or input device 5205 or may be provided from a data source. Data may be provided by a network on an input 5206. The processor is also provided or programmed with an instruction set or program executing the methods of the present invention is stored on a memory 5202 and is provided to the processor 5203, which executes the instructions of 5202 to process the data from 5201. The processor also has a communication channel 5207 to receive external data from a communication device and to transmit data to an external device. An output device 5204 may be a display to display a correlation graph or any other device to receive data. The processor can be dedicated hardware. However, the processor can also be a CPU or any other computing device that can execute the instructions of 5202. Accordingly, the system as illustrated in FIG. 37 provides a system for processing n-state symbols with n=2 or n>2 as provided herein and is enabled to execute the steps of the methods as provided herein as an aspect of the present invention.

The system thus includes a memory that is enabled to store the sequence of n-state symbols. Either to store it for processing after it has been received from a source, or to store it after it has been generated by a configuration of an n-state LFSR.

In one embodiment of the present invention, data that determines the configuration of the n-state LFSR is stored, with an indication that the generator is an n-state m-sequence generator and with data that determines the size p of the shift register, the taps and the related n-state inverters, and if desired the value of n; and if desired the length $n^p-1$ of the m-sequence that can be generated; and if desired an initial state of the generator and if desired details related to n-state inverters that are part of the n-state LFSR.

In one embodiment of the present invention a program on a processor that executes an n-state logic function with two inputs and an output, or an n-state inverter with an input and an output with n=2 or n>2, is updated by a parallel processor by reloading the updated program with a new truth table for the n-state logic function or the n-state inverter by using previously stored processor status data, in such a manner that a user of the system does not substantially experience an interruption. Quantitatively, this means that a processor is updated with a period of preferably less than 1 msec, more preferably in a period of less than 0.1 msec and even more preferably in a period less than 10 microseconds. Another way of saying this is that an update happens in one embodiment of the present invention within a screen or display refresh period.

In one embodiment of the present invention a feedback shift register is implemented as a dedicated electronic circuit. In one embodiment of the present invention a feedback shift register is implemented on a processor. The different states of the shift register may thus be created as a result of the feedback circuit. They may also be calculated by executing n-state switching functions on a processor and thus be represented as an array or vector of n-state symbols.

This will be expressed as a sequence generator being an implementation of a sequence generator that is defined by an n-state feedback shift register of p n-state shift register elements, wherein each generated n-state symbol corresponds with a content of the shift register of p n-state symbols and p is an integer greater than 1. This means that the sequence generator in one embodiment of the present invention is a dedicated feedback shift register and in another embodiment of the present invention is a series of instructions on a processor with memory, the processor being enabled to perform instructions, for instance stored in and retrieved from the memory to perform the steps to generate n-state symbols. The expressions represented by the instructions are executed in the order of listing and thus automatically create the correct order and steps of a sequence generator. The generated symbols in one embodiment of the present inventions are outputted on an output of the processor for instance via a signal converter such as a D/A (digital/analog) converter or any other binary to n-state converter to provide the signals that represent the sequence of n-state symbols.

Defined by an n-state feedback-shift register of p n-state shift register elements means in one embodiment of the present invention that a shift register with p shift register elements each enabled to hold and an n-state symbol and wherein taps exists with at least one tap being connected to an input that is not the input of the first shift register element or to an output that is not the last shift register element through a two input/single output n-state function that will generate the same sequence of n-state symbols as a program implemented on a processor. In one embodiment of the present invention defined by an n-state feedback-shift register of p n-state shift register elements means an actual n-state feedback shift register. In one embodiment of the present invention a programmed n-state feedback shift register is an actual n-state feedback shift register as, with application with appropriate converters signals can be generated by both implementations wherein no distinction in the resulting sequence of signals can be detected.

A clock signal is assumed for all shift register based operations, even if not specifically identified. The term linear in linear feedback shift register refers to the serial configuration of shift register elements and not to linear properties of switching functions, unless specifically stated otherwise.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (2) U.S. Non-Provisional patent application Ser. No. 10/936,181, filed Sep. 8, 2004, entitled TERNARY AND HIGHER MULTI-VALUE SCRAMBLERS/DESCRAMBLERS; (3) U.S. Non-Provisional patent application Ser. No. 10/912,954, filed Aug. 6, 2004, entitled TERNARY AND HIGHER MULTI-VALUE SCRAMBLERS/DESCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (6) U.S. Non-Provisional patent application Ser. No. 11/065,836 filed Feb. 25, 2005, entitled GENERATION AND DETECTION OF NON-BINARY DIGITAL SEQUENCES; (7) U.S. Non-Provisional patent application Ser. No. 11/139,835 filed May 27, 2005, entitled Multi-Valued Digital Information Retaining Elements and Memory Devices; (8) U.S. Non-Provisional patent application Ser. No. 12/137,945 filed on Jun. 12, 2008, entitled Methods and Systems for Processing of n-State Symbols with XOR and EQUALITY Binary Functions; (9) U.S. Non-Provisional patent application Ser. No. 11/679,316, filed on Feb. 27, 2007, entitled METHODS AND APPARATUS IN FINITE FIELD POLYNOMIAL IMPLEMENTATIONS; (10) U.S. Non-Provisional patent application Ser. No. 11/696,261, filed on Apr. 4, 2007, entitled BINARY AND N-VALUED LFSR AND LFCSR BASED SCRAMBLERS, DESCRAMBLERS, SEQUENCE GENERATORS AND DETECTORS IN GALOIS CONFIGURATION; (11) U.S. Non-Provisional patent application Ser. No. 11/964,507 filed on Dec. 26, 2007, entitled IMPLEMENTING LOGIC FUNCTIONS WITH NON-MAGNITUDE BASED PHYSICAL PHENOMENA; (12) U.S. Non-Provisional patent application Ser. No. 12/273,262, filed on Nov. 18, 2008, entitled Methods and Systems for N-state Symbol Processing with Binary Devices; (13) U.S. patent application Ser. No. 11/566,725, filed on Dec. 5, 2006, entitled ERROR CORRECTING DECODING FOR CONVOLUTIONAL AND RECURSIVE SYSTEMATIC CONVOLUTIONAL ENCODED SEQUENCES; (14) U.S. patent application Ser. No. 11/555,730 filed on Nov. 2, 2006, entitled SCRAMBLING AND SELF-SYNCHRONIZING DESCRAMBLING METHODS FOR BINARY AND NON-BINARY DIGITAL SIGNALS NOT USING LFSRs; (15) U.S. patent application Ser. No. 11/680,719 filed on Mar. 1, 2007, entitled MULTI-VALUED CHECK SYMBOL CALCULATION IN ERROR DETECTION AND CORRECTION; (16) U.S. patent application Ser. No. 11/739,189 filed on Apr. 24, 2007, entitled ERROR CORRECTION BY SYMBOL RECONSTRUCTION IN BINARY AND MULTI-VALUED CYCLIC CODES; (17) U.S. patent application Ser. No. 11/775,963 filed on Jul. 11, 2007, entitled Error Correction in Multi-Valued (p,k) Codes; (18) U.S. patent application Ser. No. 11/743,893 filed on May 3, 2007, entitled Symbol Reconstruction in Reed-Solomon Codes; (19) U.S. patent application Ser. No. 11/969,560 filed on Jan. 4, 2008, entitled Symbol Error Correction by Error Detection and Logic Based Symbol Reconstruction; (20) U.S. patent application Ser. No. 12/400,900 filed on Mar. 10, 2009, entitled Multi-State Symbol Error Correction in Matrix Based Codes; (21) U.S. patent application Ser. No. 12/952,482 filed on Nov. 23, 2010, entitled Methods and Apparatus in Alternate Finite Field Based Coders and Decoders; (22) U.S. Pat. No. 8,374,289 to Lablans on Feb. 12, 2013, entitled Generation and detection of non-binary digital sequences; and U.S. Pat. No. 8,364,977 to Lablans on Jan. 29, 2013 entitled Methods and systems for processing of n-state symbols with XOR and EQUALITY binary functions; and U.S. Pat. No. 8,180,817 to Lablans on May 15, 2012 entitled Encipherment of digital sequences by reversible transposition methods.

While there have been shown, described and pointed out fundamental novel features and aspects of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the claims.

The invention claimed is:

1. A method for testing a property of a sequence of at least k n-state symbols with n an integer greater than 1 and k an integer greater than 2, each n-state symbol being represented by a signal, comprising:
   a processor selecting a first n-state inverter from a plurality of n-state inverters and implementing the first n-state inverter in a shift register of p n-state shift register elements with feedback with p an integer greater than 1 and at least one n-state switching function;
   the processor generating n-state symbols in the sequence by a sequence generator that is defined by a first configuration that includes the n-state feedback shift register of p n-state shift register elements, the first n-state inverter and the at least one n-state switching function, wherein each generated n-state symbol corresponds with a content of the shift register of p n-state symbols, wherein the processor generates a first n-valued symbol and stores a corresponding first content of the shift register of p n-state symbols in a memory;
   the processor generating a $k^{th}$ n-valued symbol in the sequence of at least k n-state symbols based on a $k^{th}$ content of the shift register; and
   the processor comparing the $k^{th}$ shift register content of p n-state symbols with the first content of the shift register of p n-state symbols corresponding with generating the first n-state symbol in the sequence of n-state symbols to determine if the first content of the shift register of p n-valued symbols is repeated to decide to generate the next symbol in the sequence of n-state symbols.

2. The method of claim 1, wherein n>2.

3. The method of claim 1, further comprising:
   the processor stopping generating the sequence of n-state symbols after a repeat of the first content of the p n-state shift registers is detected.

4. The method of claim 3, further comprising:
   the processor reconfiguring the sequence generator that is defined by the first configuration including replacing the first n-state inverter with a second n-state inverter and initializing the shift register and restarting the generation of the sequence of n-state symbols.

5. The method of claim 1, wherein the sequence generator that is defined by the first configuration generates $n^p-1$ n-state symbols in the sequence of n-state symbols without repeating the first content of the shift register of p n-valued symbols.

6. The method of claim 5, further comprising:
   placing the first configuration of the sequence generator in a catalog of sequence generators.

7. The method of claim 1, wherein the comparing is performed by the processor comparing representative values of contents of the shift register.

8. The method of claim 1, further comprising:
   receiving the sequence of k n-state symbols by a second processor;
   the second processor creating a plurality of checkwords from the k n-state symbols; and
   the second processor determining if a checkword in the plurality of checkwords is repeated.

9. The method of claim 1, further comprising:
   a communication system to process signals representing the sequence of k n-state symbols.

10. The method of claim 6, further comprising:
    selecting the sequence generator defined by the first configuration from the catalog and applying the sequence generator defined by the first configuration in a communication system.

11. A system to determine a property of a sequence of k n-state symbols with n equal to or greater than 2 and k>2, each n-state symbol being represented by a signal, comprising:
    a memory enabled to store data in and to retrieve data from including instructions;
    a processor configured to execute instructions to perform the steps:
      selecting a first n-state inverter from a plurality of n-state inverters and implementing the first n-state inverter in an n-state feedback shift register of p n-state shift register elements;
      generating n-state symbols in the sequence by a sequence generator that is defined by a first configuration that includes the n-state feedback shift register of p n-state shift register elements and at least one n-state switching function and the first n-state inverter, wherein each generated n-state symbol corresponds with a content of the shift register of p n-state symbols and p is an integer greater than 1;
      storing a first content of the shift register of p n-state symbols corresponding to generating a first n-state symbol in the memory;
      generating a $k^{th}$ n-state symbol in the sequence corresponding to a $k^{th}$ content of the shift register of p n-state symbols; and
      comparing the $k^{th}$ content of the shift register of p n-state symbols with the first content of the shift register of p n-state symbols corresponding with generating the first n-state symbol in the sequence of n-state symbols to decide to generate a next symbol in the sequence of n-state symbols.

12. The system of claim 11, wherein n>2.

13. The system of claim 11, further comprising:
    the processor being configured to stop generating the sequence of n-state symbols after a repeat of the first content of the shift register of p n-state symbols is detected.

14. The system of claim 13, further comprising:
    the processor being configured to reconfigure the n-state feedback shift register defined-by the first configuration by replacing the first n-state inverter with a second n-state inverter and initializing the shift register and restarting the generation of the sequence of n-state symbols.

15. The system of claim 11, further comprising:
    the processor being configured to detect a first occurrence of a repeat of a previous shift register content related to a start of the sequence.

16. The system of claim 11, wherein the n-state feedback shift register defined sequence generator is configured to generate $n^p-1$ n-state symbols in the sequence of n-state symbols without repeating any content of the shift register.

17. The system of claim 11, further comprising:
    a second processor is configured to execute instructions to perform the steps:
      receiving signals representing the sequence of k n-state symbols;
      creating a plurality of checkwords from the sequence of k n-state symbols; and
      determining if a checkword in the plurality of checkwords is repeated.

18. The system of claim 11, further comprising:
    a communication system implementing the sequence generator in the first configuration.

19. The system of claim 11, further comprising a memory storing a catalog of configurations of n-state sequence generators.

20. The system of claim 19, wherein a processor implements an n-state sequence generator in the first configuration selected from the catalog stored in the memory.

\* \* \* \* \*